(12) United States Patent
Murase et al.

(10) Patent No.: US 6,570,866 B1
(45) Date of Patent: May 27, 2003

(54) HIGH-SPEED FLEXIBLE LONGEST MATCH RETRIEVAL

(75) Inventors: Tutomu Murase, Tokyo (JP); Naoyuki Ogura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/266,466

(22) Filed: Mar. 11, 1999

(30) Foreign Application Priority Data

Mar. 12, 1998 (JP) ............................................ 10-061110

(51) Int. Cl.[7] .............................................. G06F 13/00
(52) U.S. Cl. ...................................... 370/351; 370/392
(58) Field of Search ................................ 370/351, 392; 711/108, 100

(56) References Cited

U.S. PATENT DOCUMENTS 5,841,874 A * 11/1998 Kempke et al. ............. 713/160
5,920,886 A * 7/1999 Feldemeier .................. 711/108
6,181,698 B1 * 1/2002 Hariguchi .................... 370/392
6,370,613 B1 * 4/2002 Diede et al. ................. 711/100

OTHER PUBLICATIONS

A Tree–Based Packet Routing Table for Berkeley Unix— Skeith Sklower—University of California, Berkeley—Usenix—Winter '91—Dallas, TX.

* cited by examiner

*Primary Examiner*—Salvatore Cangialosi
(74) *Attorney, Agent, or Firm*—Dickstein, Shapiro, Morin & Oshinsky, LLP.

(57) ABSTRACT

A router having a high-speed and flexible longest match retrieval device is disclosed. A plurality of entries are divided into a plurality of primary retrieving circuits each retrieving a primary match mask and a primary match entry depending on a given address. The primary match masks and entries obtained by the primary retrieving circuits are used to determine the longest match routing information.

27 Claims, 21 Drawing Sheets

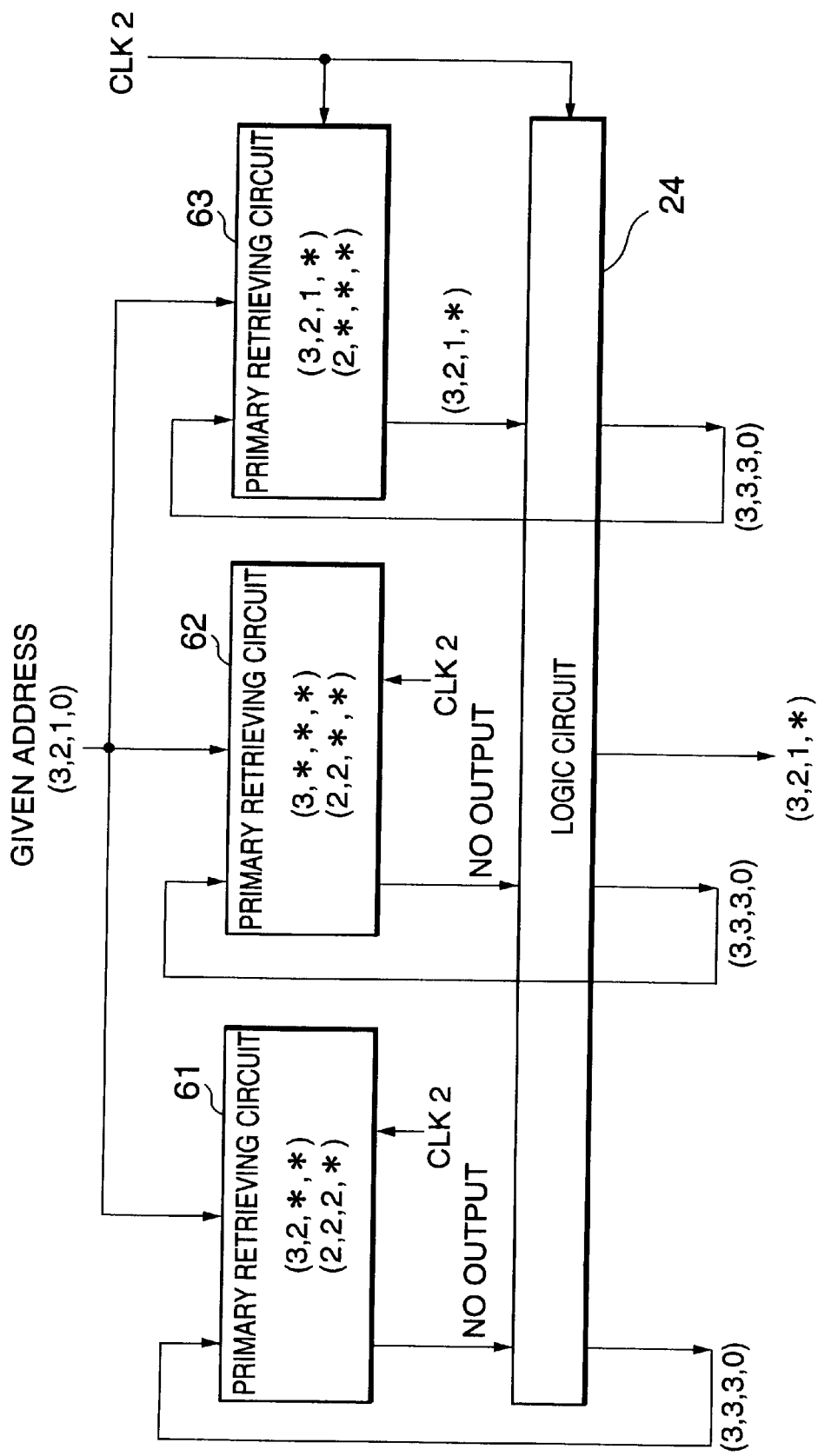

HIGH-SPEED FLEXIBLE LONGEST MATCH RETRIEVAL

BACKGROUND OF THE INVENTION

1. Field of the Invention

The present invention relates to a router, and relates, more particularly, to a longest match retrieval device and method suitable for application to a packet switching device such as an IP (Internet Protocol) router.

2. Description of Related Art

A packet switching device called an IP router (hereinafter to be simply referred to as a "router" in the description of the prior art) determines next hop information from the ultimate destination address of an input packet, and then forwards the packet to the determined next hop node. The next hop node is determined by searching for matching entry with longest prefix (longest match routing information) using the destination address of the input packet as a key.

As a method for retrieving the longest match routing information, there has been know a method using a Radix Tree as shown in FIG. 1 (UNIX MAGAZINE 1997.4, pp 20–25). Another method using a reduced radix tree has been described in "A Tree-Based Packet Routing Table for Berkeley Unix" by Keith Sklower (USENIX - Winter '91 - Dallas, Tex.). According to the conventional methods, the radix tree is used to make a decision as to where the packet will be sent next. More specifically, the radix tree is used to find the most specific entry matching the destination address of the input packet, that is, the best next-hop entry among possible entries matching the destination address. In other words, the longest match routing information is an entry corresponding to a mask having the longest non-masking bit length, which is used to identify the next hop node.

According to the above-described methods, however, the longest match routing information is retrieved by software-based system where a retrieval program runs on a processor, and therefore, it takes a long time for the retrieval processing. In other words, when this router is modeled as a queue, an average service time becomes very long, resulting in a long response time. Therefore, in the conventional router, there has been a problem that a delay occurs in packet forwarding, particularly in the router with heavy traffic.

To solve this problem, it is theoretically possible to structure a logic circuit by hardware for carrying out the same processing as carried out by software, to retrieve the longest match routing information at high speed.

However, for structuring the routing information retrieval system by hardware, it is necessary to change connections each time a new entry is added. Therefore, the expansion of entry data is very difficult, and it has been unrealistic to achieve this from cost viewpoint.

SUMMARY OF THE INVENTION

The present invention has been made to solve the above-described problems, and it is an object of the present invention to provide a longest match retrieval device and method which can retrieve longest match routing information at high speed and which easily allows the expansion of entry data.

It is another object of the present invention to provide a router, which can determine the most specific next hop node at high speed.

According to the present invention, the plurality of entries are divided into a plurality of primary retrieving circuits each retrieving a primary match mask and a primary match entry depending on a given address and the primary match masks and entries obtained by the primary retrieving circuits are used to determine the longest match routing information.

According to a first aspect of the present invention, a longest match retrieving device includes a plurality of primary retrieving circuits each comprising a memory storing at least one entry with a mask associated therewith so that the primary retrieving circuits store the plurality of entries. Each of the primary retrieving circuits retrieves a primary match entry which is a longest match to the given address to produce a primary match mask associated with the primary match entry. Further, a logic circuit is provided which selects a longest match mask from primary match masks obtained by the primary retrieving circuits. The longest match mask has a longest non-masking bit length among the primary match masks. At least one associative memory is provided which stores a plurality of second entries each formed by coupling an entry with a corresponding mask together, wherein the associative memory accesses a second entry associated with a combination of the given address and the longest match mask to output data corresponding to an entry included in the second entry accessed as the longest match.

When it is desired to add an entry to be used for routing, this can be achieved by such an arrangement that a new primary retrieving circuit is added, and a second entry corresponding to the new entry is added to the associative memory. If the capacity of the associative memory is full, the new entry data can be added by adding a new associative memory to the existing associative memories.

Further, since the primary retrieving operation and the associative memory-operation are performed in pipelines, it is possible to carry out the retrieval of the longest match routing information at high speed, and the entry data can be expanded easily.

According to a second aspect of the present invention, the device may include a plurality of associative memories provided corresponding to the primary retrieving circuits, respectively, each of the associative memories storing said at least one entry stored in a corresponding primary retrieving circuit, wherein each of the associative memories outputs an entry associated with the given address. A logic circuit is provided for selectively enabling the associative memories depending on which primary match mask has a longest non-masking bit length among primary match masks obtained by the primary retrieving circuits. And a combiner is provided to combine an entry of each enabled associative memory to produce the longest match.

According to a third aspect of the present invention, a longest match retrieving device includes a plurality of primary retrieving circuits. Each of them includes a memory storing at least one entry with a mask associated therewith so that the primary retrieving circuits store the plurality of entries, and a searcher for searching the memory for an entry which is a longest match to the given address to output a primary match mask associated with the entry and further searching the memory for a primary match entry matching to the primary match mask.

In addition, a first logic circuit is provided which selects a longest match mask from primary match masks inputted from the primary retrieving circuits, the longest match mask having a longest non-masking bit length among the primary match masks. And a second logic circuit is provided which selects a longest match entry from primary match entries inputted from the primary retrieving circuits depending on which primary match mask is the longest match mask to output the longest match entry as the longest match.

The first logic circuit may select a longest match mask from primary match masks inputted from the primary retrieving circuits to output the longest match mask as the input mask to the primary retrieving circuits so that each of the primary retrieving circuits outputs the primary match entry associated with the longest match mask, the longest match mask having a longest non-masking bit length among the primary match masks. And the second logic circuit may select a longest match entry from primary match entries inputted from the primary retrieving circuits depending on which primary match mask is the longest match mask to output the longest match entry as the longest match.

In addition to the primary retrieving circuits, a logic circuit may be provided which, when the selection clock signal is in the first state, selects a longest match mask from primary match masks inputted from the primary retrieving circuits to output the longest match mask as the input mask to the primary retrieving circuits so that each of the primary retrieving circuits outputs the primary match entry associated with the longest match mask the longest match mask having a longest non-masking bit length among the primary match masks and, when the selection clock signal is in the second state, selects a longest match entry from primary match entries inputted from the primary retrieving circuits depending on which primary match mask is the longest match mask to output the longest match entry as the longest match.

BRIEF DESCRIPTION OF THE DRAWINGS

FIG. 22 is a diagram for explaining an operation of the address retrieving circuit according to the eighth embodiment when receiving a second clock signal CLK2.

DETAILED DESCRIPTION OF THE PREFERRED EMBODIMENTS

Hereinafter, for the convenience of explanation, it is assumed that given address data used for the longest match routing information retrieval is structured by eight bits separated at every two bits, which, for example, is expressed like (1. 2. 3. 0) in quad notation. All the notations within the parentheses are assumed to be in quad representation, unless otherwise specified. A mask to be described later is assumed to have a unit of two bits in a manner similar to the separation of the address, and masked two bits in entry data to be described later are expressed by "★".

Network

Figure 1:
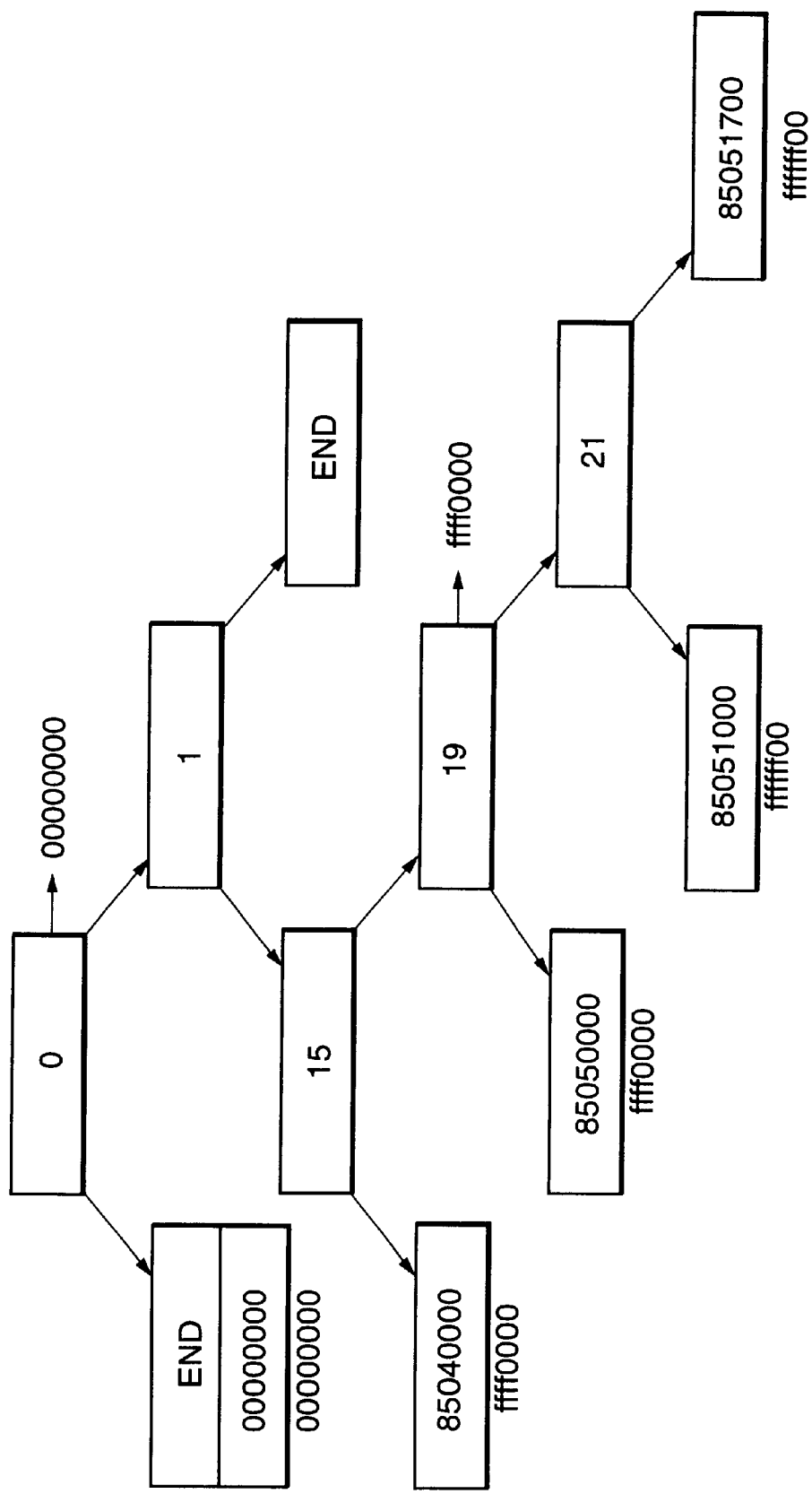
FIG. 1 is a diagram for explaining a Radix Tree used for retrieving the routing information in conventional routing control.
Figure 2:
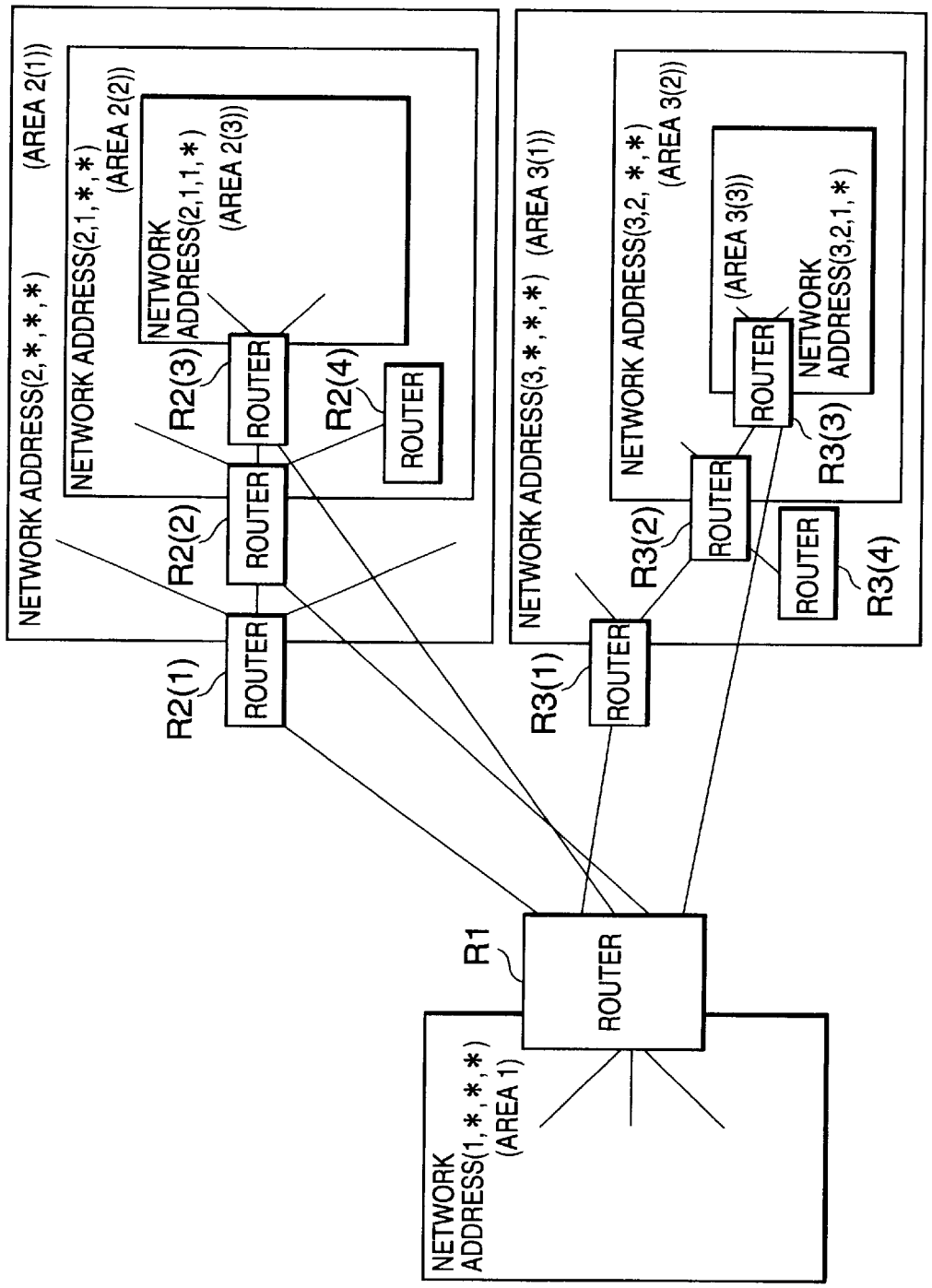
FIG. 2 is a diagram for showing the configuration of a packet switching network including routers according to the present invention.

As shown in FIG. 2, a packet switching network is composed of a plurality of routers, R1, R2(1) to R2(4), and R3(1) to R3(4), which connect nodes on different networks. For example, the route R1 connects between a network having a network address (1, ★, ★, ★) allocated thereto and each of the other respective networks having the network addresses (2, ★, ★, ★), (2, 1, ★, ★), (2, 1, 1, ★), (3, ★, ★, ★), and (3, 2, 1, ★) allocated thereto.

The router R1 retrieves the longest match routing information which specifies a next-hop router toward the ultimate destination of an input packet among the routers R2(1) to R2(2) and R3(1) to R3(4). Then the packet is forwarded to the next hop router corresponding to the longest match routing information.

For example, in the case where the destination address of the input packet is (2, 1, 1, 1), any one of the routers R2(1) to R2(3) on the respective networks having the network addresses (2, ★, ★, ★), (2, 1, ★, ★), and (2, 1, 1, ★) allocated thereto is a correct router in terms of the direction of packet forwarding. However, the network address (2, 1, 1, ★) is the longest match to the given destination address (2, 1, 1, 1). Therefore, the router R1 forwards the packet to the router R2(3) on the network having the network address (2, 1, 1, ★).

Router

Figure 3:
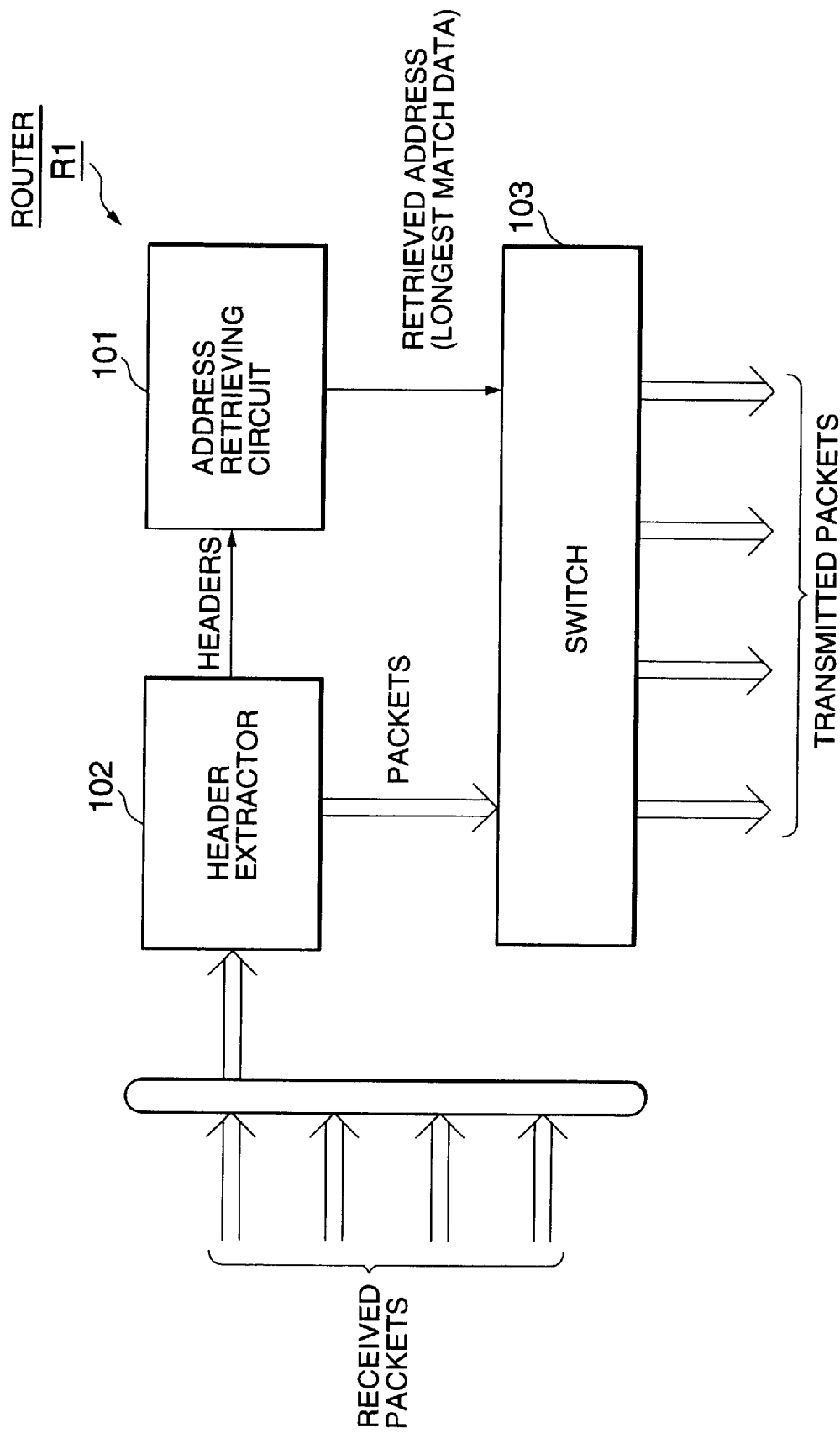
FIG. 3 is a block diagram showing the circuit of a router of FIG. 2.

Referring to FIG. 3, the router R1 is comprised of an address retrieving circuit 101, a header extractor 102, and a switch 103. The header extractor 102 extracts a header including the destination address from an input packet, and outputs the extracted header to the address retrieving circuit 101 and the received packets to the switch 103. The address retrieving circuit 101 retrieves a final result address which is the longest match routing information the destination address of the extracted header. The circuit configuration of the address retrieving circuit 101 will be explained later in detail.

The switch 103 forwards the packets received from the header extractor 102 to the router R2(1) to R2(4) and R3(1) to R3(4) based on the retrieved addresses retrieved by the address retrieving circuit 101, respectively.

First Embodiment

Figure 4:
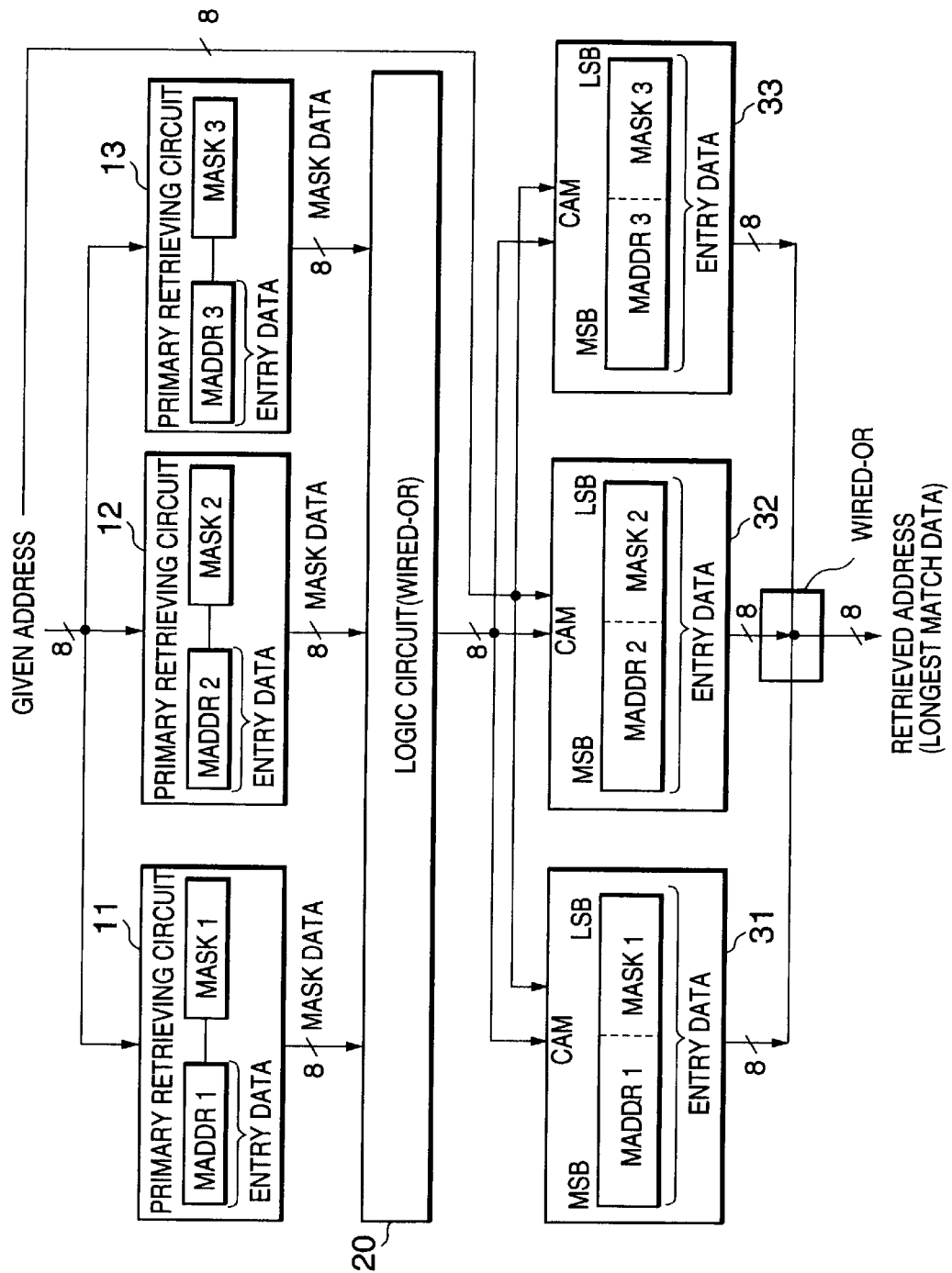
FIG. 4 is a block diagram for showing an address retrieving circuit according to a first embodiment of the present invention.

As shown in FIG. 4, the address retrieving circuit 101 according to a first embodiment of the present invention is comprised of a primary retrieving circuits 11 to 13, a logic circuit 20, and CAMs (Contents Associated Memories) 31 to 33. Here, each signal line is an 8-bit signal line.

Each of the primary retrieving circuits 11 to 13 includes a memory storing a plurality of entries and masks, wherein the entries are obtained by masking each router address with a corresponding mask and the masks are used to obtain the corresponding entries, respectively. Each of the primary retrieving circuits 11 to 13 compares a given address (the ultimate destination address of an input packet) with each entry as described later, and outputs a mask corresponding to the longest match entry with the longest prefix among a plurality of entries leftmost matching to the given address.

More specifically, the primary retrieving circuit 11 stores a collection of masked addresses $MADDR1_1$, $MADDR1_2$, . . . as entry data and a collection of masks $MASK1_1$, $MASK1_2$, . . . corresponding to the masked addresses $MADDR1_1$, $MADDR1_2$, . . . , respectively. When receiving the given address, the primary retrieving circuit 11 starts searching the collection of masked addresses $MADDR1_1$, $MADDR1_2$, . . . for matching entry with the longest prefix and then reads the longest match mask corresponding to the longest match masked address to put it to the logic circuit 20. Similarly, the primary retrieving circuit 12 stores a collection of masked addresses $MADDR2_1$, $MADDR2_2$, . . . as entry data and a collection of masks $MASK2_1$, $MASK2_2$, . . . corresponding to the masked addresses MADDR2, respectively. The primary retrieving circuit 13 stores a collection of masked addresses $MADDR3_1$, $MADDR3_4$, . . . as entry data and a collection of masks $MASK3_1$, $MASK3_2$, . . . corresponding to the masked addresses $MADDR3_1$, $MADDR3_2$, . . . respectively.

The logic circuit 20 receives the longest match mask from each of the primary retrieving circuits 11 to 13 and performs a logical OR function in bit lines on the 8-bit output lines of the primary retrieving circuits 11 to 13. The logic circuit 20 may be a wired-OR circuit having directly connected bit lines corresponding to the 8-bit output lines of the primary retrieving circuits 11 to 13. For example, in the case where the outputs of the primary retrieving circuits 11 to 13 are (3, 3, 3, 0), (3, 3, 0, 0) and (3, 0, 0, 0), respectively, the output data of the logic circuit 20 becomes (3, 3, 3, 0).

Each of the CAM's 31 to 33 stores a plurality of entries each obtained by coupling the corresponding entry as high-order bits with the corresponding mask as low-order bits stored in the corresponding one of the primary retrieving circuits 11 to 13. A combination of the given address data as high-order bits and the output data of the logic circuit 20 as low-order bits is input in common to the CAM's 31 to 33. When a content-association match occurs in one of the CAM's 31 to 33, the CAM outputs the corresponding entry (CAM address) stored in the corresponding one of the primary retrieving circuits 11 to 13. Since a CAM outputs nothing when no match occurs and outputs a matching CAM address when a match occurs, the output data of the CAM's 31 to 33 are combined (ORed) to produce the retrieved CAM address (hereinafter, simply called "retrieved address") as the longest match routing information.

Figure 5:
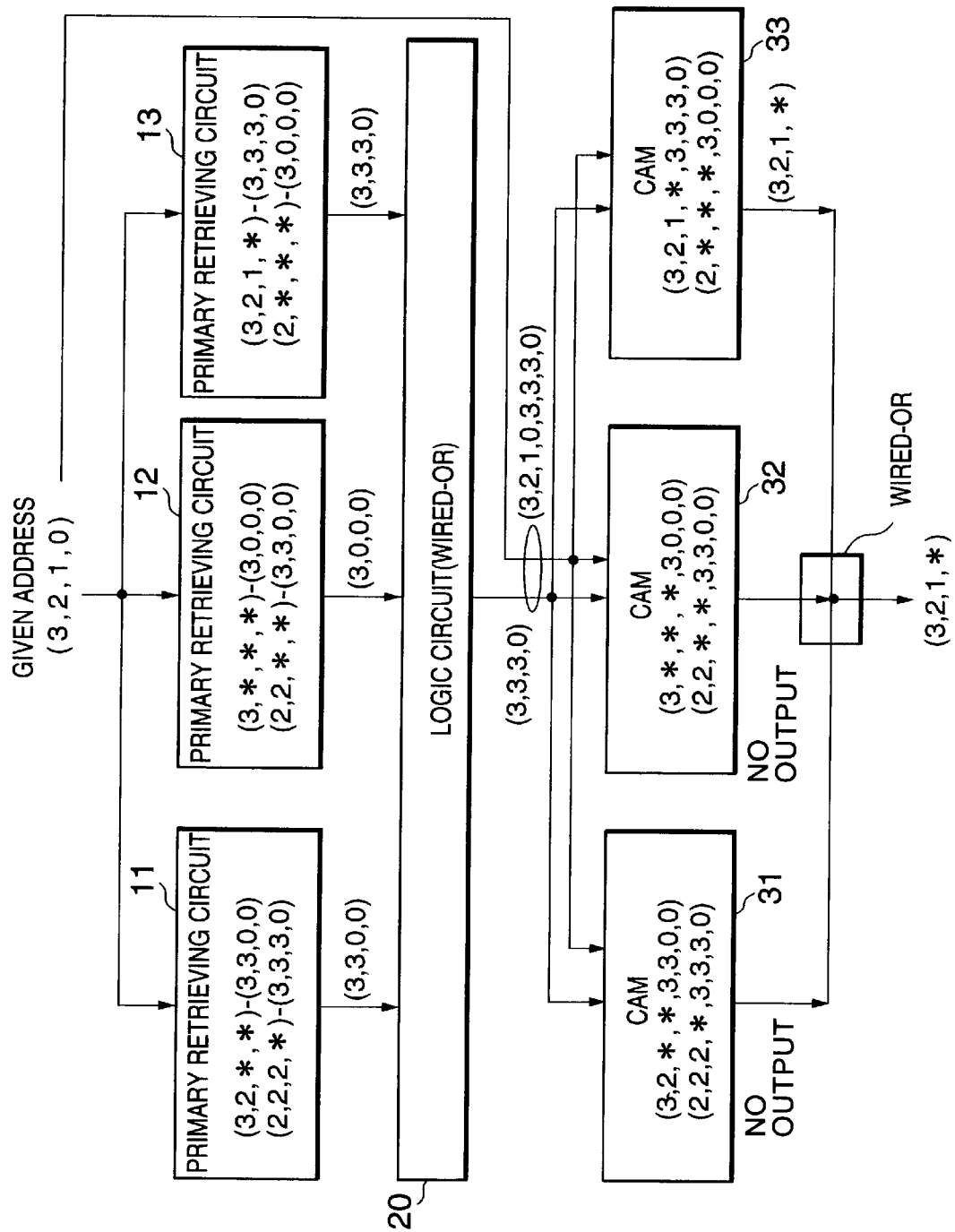
FIG. 5 is a diagram for explaining an operation of the address retrieving circuit according to the first embodiment of the present invention.

As shown in FIG. 5, the primary retrieving circuit 11 stores masked addresses (3, 2, ★, ★) and (2, 2, 2, ★) as entry data and masks (3, 3, 0, 0) and (3, 3, 3, 0) corresponding thereto, respectively. The primary retrieving circuit 12 stores masked addresses (3, ★, ★, ★) and (2, 2, ★, ★) as entry data and masks (3, 0, 0, 0) and (3, 3, 0, 0) corresponding thereto, respectively. Further, the primary retrieving circuit 13 stores masked addresses (3, 2, 1, ★) and (2, ★, ★, ★) as entry data and masks (3, 3, 3, 0) and (3, 0, 0, 0) corresponding thereto, respectively.

Further, the CAM 31 stores entries (3, 2, ★, ★, 3, 3, 0, 0) and (2, 2, 2, ★, 3, 3, 3, 0), and stores content-association data (3, 2, ★, ★) and (2, 2, 2, ★) corresponding to the entries, respectively. Similarly, the CAM 32 stores entries (3, ★, ★, ★, 3, 0, 0, 0) and (2, 2, ★, ★, 3, 3, 0, 0), and stores content-association data (3, ★, ★, ★) and (2, 2, ★, ★) corresponding to the entries, respectively, The CAM 33 stores entries (3, 2, 1, ★, 3, 3, 3, 0) and (2, ★, ★, ★, 3, 0, 0), and stores content-association data (3, 2, 1, ★) and (2, ★, ★, ★) corresponding to the entries, respectively.

The operation of the router R1 according to the first embodiment will be explained hereinafter.

When the router R1 receives a packet, the header extractor 102 extracts the header from the received packet and outputs it to the address retrieving circuit 101 as shown in FIG. 5. Assuming that the destination address of the packet is (3, 2, 1, 0), the primary retrieving circuits 11 to 13 inputs the destination address (3, 2, 1, 0) as the given address.

In each of the primary retrieving circuits 11 to 13, the given address (3, 2, 1, 0) is sequentially compared with the entries stored therein, and the mask corresponding to the longest match entry having the longest prefix bit length among the entries having match bit lengths with respect to the given address (3, 2, 1, 0) is output to the logic circuit 20. For example, in the primary retrieving circuit 11, the given address (3, 2, 1, 0) is sequentially compared with the entries (3, 2, ★, ★) and (2, 2, 2, ★). In this case, the longest match address is the entry (3, 2, ★, ★) having the same high order consecutive four bits (3, 20). Therefore, the mask (3, 3, 0, 0) corresponding to the longest match address (3, 2, ★, ★) is output as the longest match mask to the logic circuit 20. In other words, the longest match mask has the longest unmasked bit length.

In this way, the respective primary retrieving circuits 11 to 13 output the longest match masks (3, 3, 0, 0), (3, 0, 0, 0) and (3, 3, 3, 0) to the logic circuit 20.

The logic circuit 20 performs the logical OR function on the mask data (3, 3, 0, 0), (3, 0, 0, 0) and (3, 3, 3, 0) received from the primary retrieving circuits 11 to 13, respectively, and outputs combined mask data (3, 3, 3, 0) to the CAM's 31 to 33. The output data (3, 3, 3, 0) of the logic circuit 20 is input to the CAM's 31 to 33 as low-order bits. On the other hand, the given address (3, 2, 1, 0) is input as high-order bits to the CAM's 31 to 33. Therefore, each of the CAM's 31 to 33 compares the low-order and high-order combined bits (3, 2, 1, 0, 3, 3, 3, 0) with the entry data stored therein.

In this case, since the CAM's 31 to 32 do not store therein entry data matching to the combined bits (3, 2, 1, 0, 3, 3, 3, 0), they do not make an output. On the other hand, since the CAM 33 stores therein the entry data (3, 2, 1, ★, 3, 3, 3, 0) matching to the data (3, 2, 1, 0, 3, 3, 3, 0), the CAM 33 outputs a CAM address corresponding to (3, 2, 1, ★) stored as content-association data. For simplicity, the CAM address corresponding to (3, 2, 1, ★) is denoted by the output data (3, 2, 1, ★) of a CAM.

Since no data is being output from the CAM's 31 and 32, the output data (3, 2, 1, ★) of the CAM 33 directly becomes the final result address, that is, the longest match routing information, even if the data is wired-ORed with the output data of the CAM's 31 to 32, and the result is output as the retrieved address from the address retrieving circuit 101.

When the data (3, 2, 1, ★) is output as the longest match routing information from the address retrieving circuit 101, the switch 103 outputs the packet inputted from the header extractor 103 to the router R3(3) shown by the address (3, 2, 1, ★), as shown in FIGS. 2 and 3.

According to the first embodiment, the longest match mask is obtained by the primary retrieving circuits 11–13 and the logic circuit 20 and then the CAMs 31–33 use the longest match mask to produce the retrieved CAM address. In other words, the primary retrieving operation and the CAM operation are performed in pipelines, resulting in very rapid address retrieving.

It is now assumed, in the network system as shown in FIG. 2, that the router R1 is newly connected to the router R3(4) having the address of (3, 2, 2, ★). In such an expansion case, a primary retrieving circuit and a CAM for the new connection may be newly added to the address retrieving circuit 101.

Figure 6:
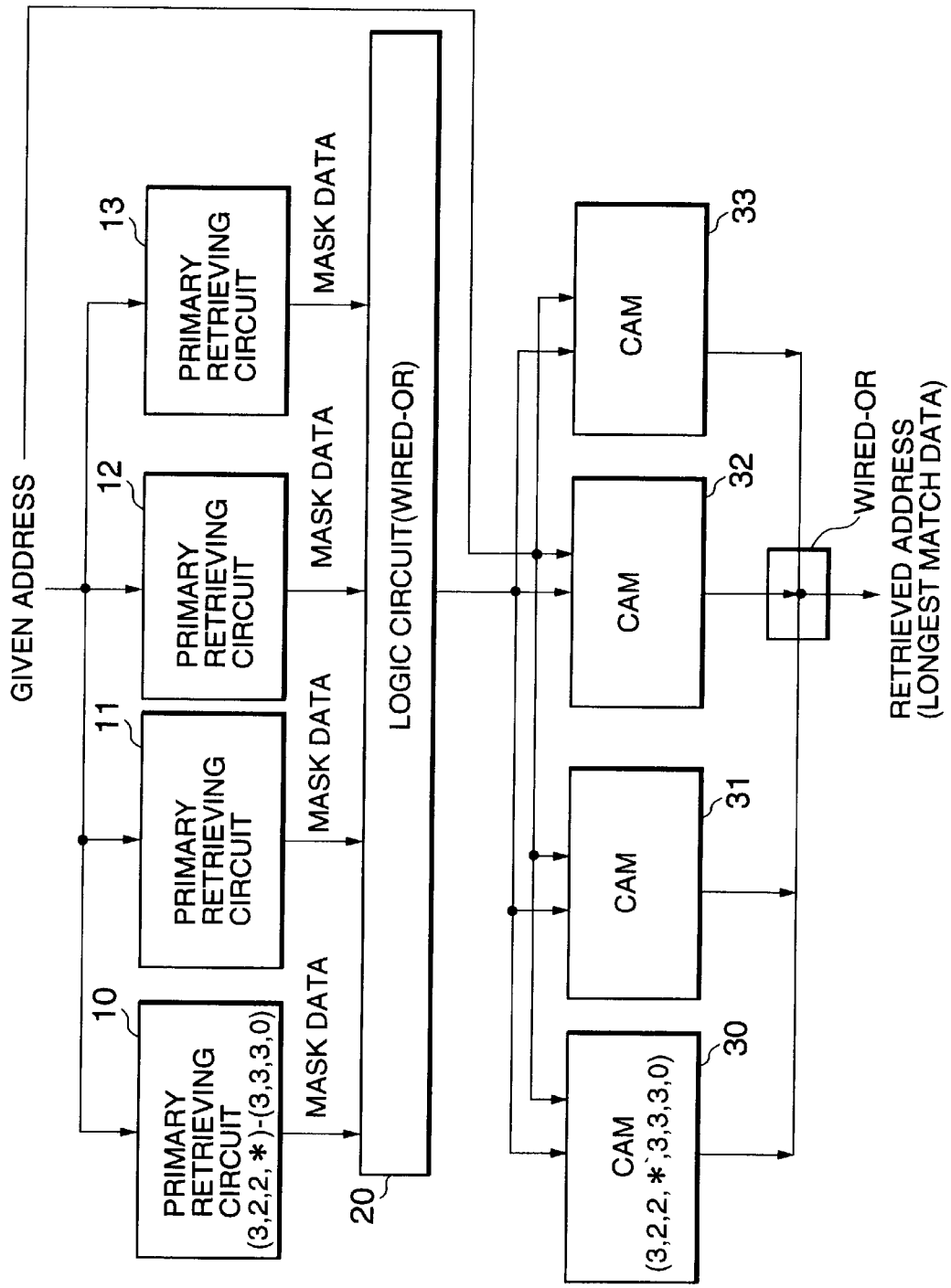
FIG. 6 is a diagram showing an example of an expansion of the address retrieving circuit according to the first embodiment of the present invention.

As shown in FIG. 6, a primary retrieving circuit 10 and a CAM 30 are added to the address retrieving circuit 101. In this case, the primary retrieving circuit 10, (3, 2, 2, ★) is stored as entry data, and (3, 3, 3, ★) is stored as the corresponding mask data. On the other hand, in the CAM 30, (3, 2, 2, ★, 3, 3, 3, 0) is stored as entry data, and (3, 2, 2, ★) is stored as content-association data. Alternately, if there is room in the capacity of any one of the primary retrieving circuits 11 to 13 and the CAM's 31 to 33, these data may be stored in the portion having such room.

For example, in the state before the expansion, the packet including the ultimate destination address (3, 2, 2, 1) is first forwarded from the router R1 to the router R3(1), and then to the router R3(4) through the router R3(2). However, in the state after the expansion, the packet is forwarded directly from the router R1 to the router R3(4).

As described above, the router R1 of the first embodiment allows easy addition of entry data used to make a decision as to where a packet will be sent next. Further, since the address retrieving circuit 101 is structured by hardware and the primary retrieving and the CAM retrieving are performed in pipelines in the router R1 of the present embodiment, the next hop node address of the packet can be determined rapidly.

Second Embodiment

The network, the address data and the routers according to the second embodiment have structures almost similar to those of the first embodiment, except that the structure of the address retrieving circuit 101 is different from that of the first embodiment. While the CAM's 31 to 33 are provided by the number equivalent to the number of the primary retrieving circuits 11 to 13 in the first embodiment, only one CAM may be provided in the second embodiment.

Figure 7:
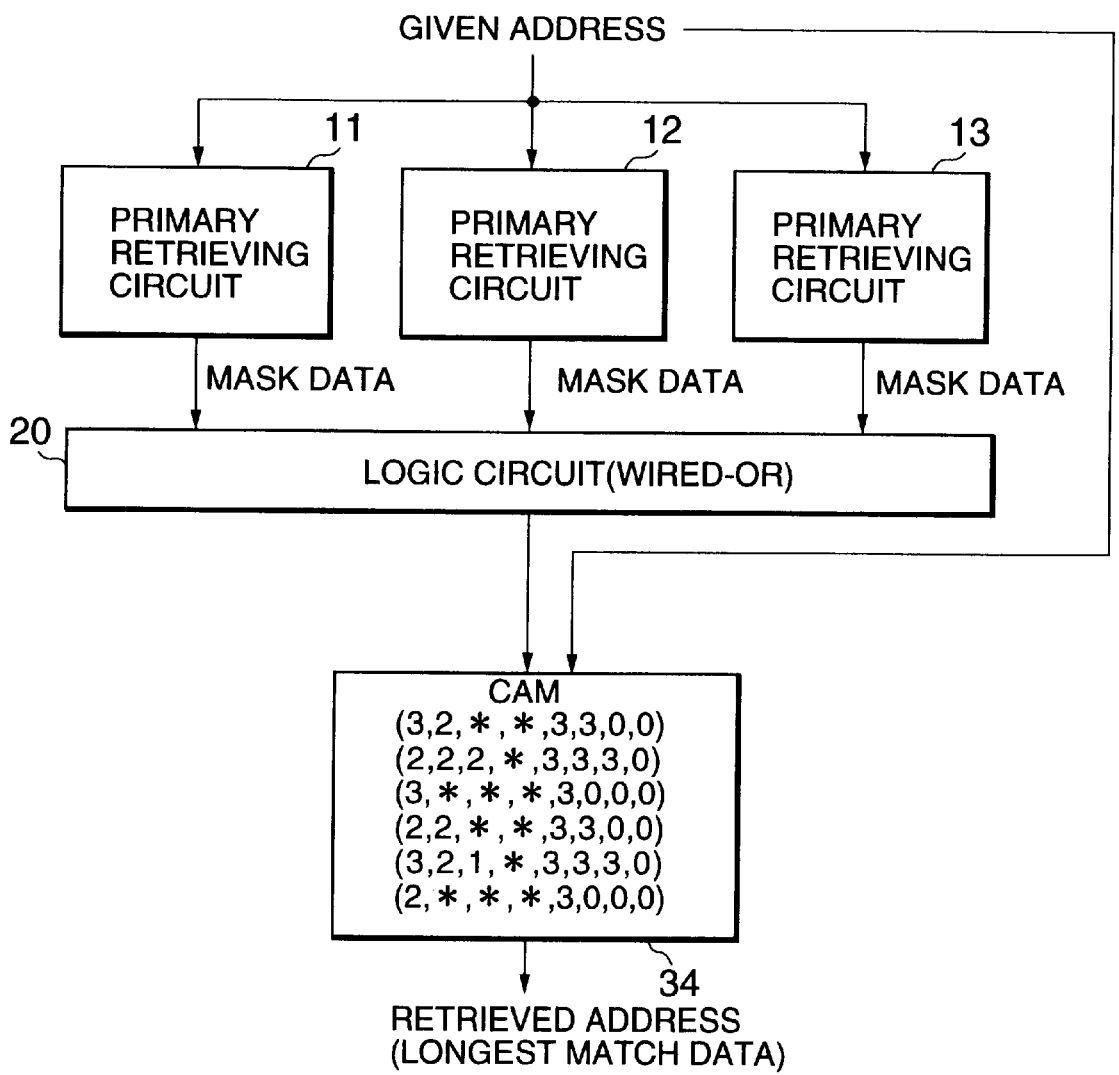
FIG. 7 is a block diagram showing an address retrieving circuit according to a second embodiment of the present invention.

As shown in FIG. 7, a CAM 34 has all the entries which are stored in the CAM's 31 to 33 in the first embodiment. The primary retrieving circuits 11 to 13 and the logic circuit 20 are the same as those in the first embodiment.

While the operation of the second embodiment is almost similar to that of the first embodiment, the wired-OR is not taken like the first embodiment, but the output data of the CAM 34 becomes the final result address, that is, the longest match routing information.

As described above, if the capacity of the CAM 34 is greater than the total capacity of the primary retrieving circuits 11 to 13, it is possible to obtain a correct final result address (the longest match routing information) even if the number of the CAM's is smaller than the number of the primary retrieving circuits.

Furthere, since the address retrieving circuit 101 is structured by hardware and the primary retrieving and the CAM retrieving are performed in pipelines in the router R1 of the present embodiment, the next hop node address of the packet can be determined rapidly.

Third Embodiment

The network, the address data and the routers according to the present embodiment have structures almost similar to the structures of the first embodiment, except that the structure of the address retrieving circuit 101 is different from that of the first embodiment. While in the first embodiment, the CAM's 31 to 33 are provided by the number equivalent to the number of the primary retrieving circuits 11 to 13, a different number of CAM's are provided in the third embodiment.

Figure 8:
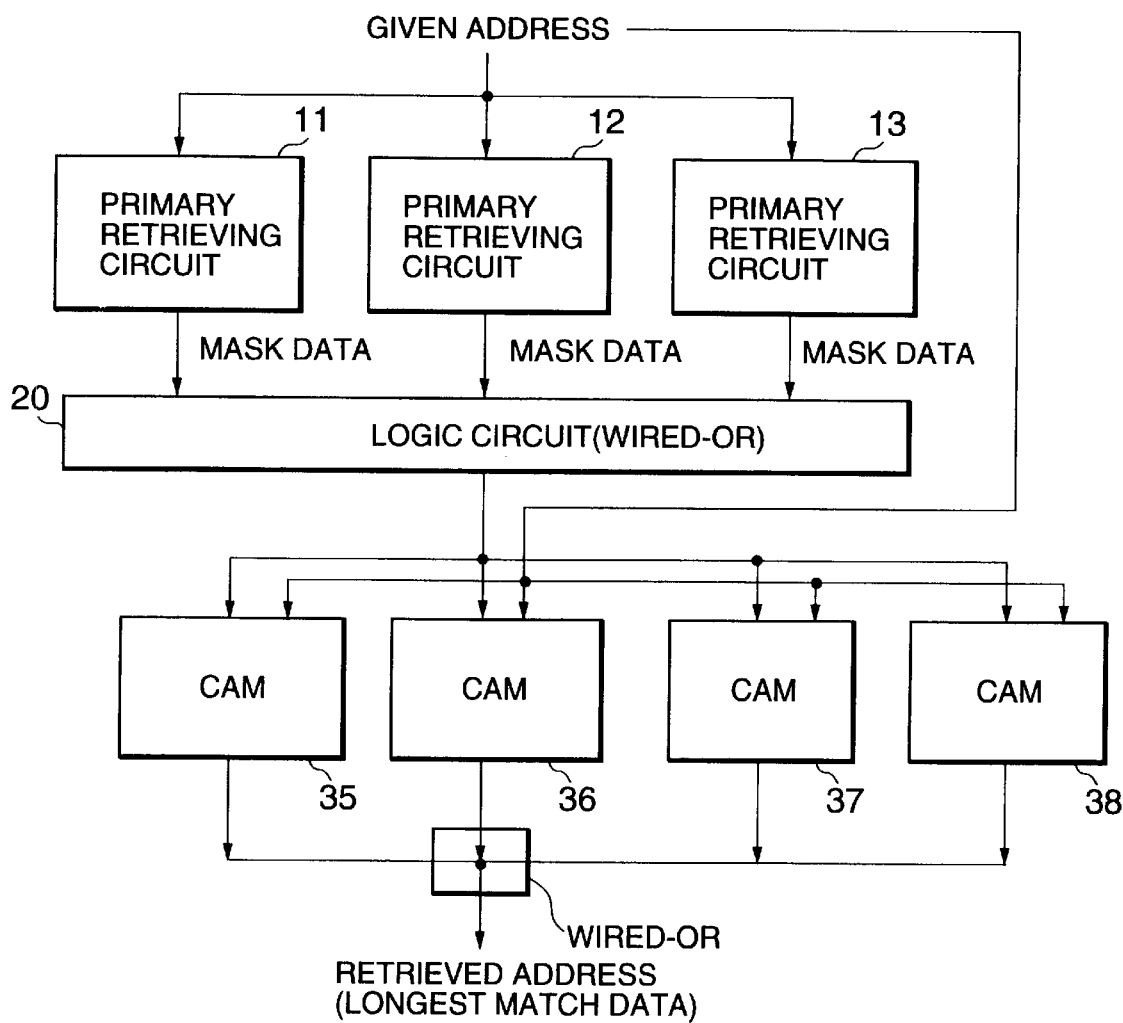
FIG. 8 is a block diagram showing an address retrieving circuit according to a third embodiment of the present invention.

As shown in FIG. 8, four CAM's 35 to 38 are provided to respectively store four groups of entry data into which the entries stored in the three CAM's 31 to 33 in the first embodiment are divided. The primary retrieving circuits 11 to 13 and the logic circuit 20 are the same as those in the first embodiment.

The operation of the third embodiment is the same as that of the first embodiment, and the output data of the CAM's 35 to 38 are wired-ORed to produce the final result address, that is, the longest match routing information.

As described above, even if the capacity of each of the CAM's 35 to 38 is smaller than each capacity of the primary retrieving circuits 11 to 13, it is possible to obtain a correct final result address (the longest match routing information) if the number of the CAM's is sufficiently larger than the number of the primary retrieving circuits.

As shown in the first to the third embodiments, the relationship between the number of the primary retrieving circuits and the number of the CAM's can be set appropriately depending on the capacity thereof.

Fourth Embodiment

The network, the address data and the routers according to the present invention have structures almost similar to the structures of the first embodiment, except that the structure of the address retrieving circuit 101 is different from that of the first embodiment.

Figure 9:
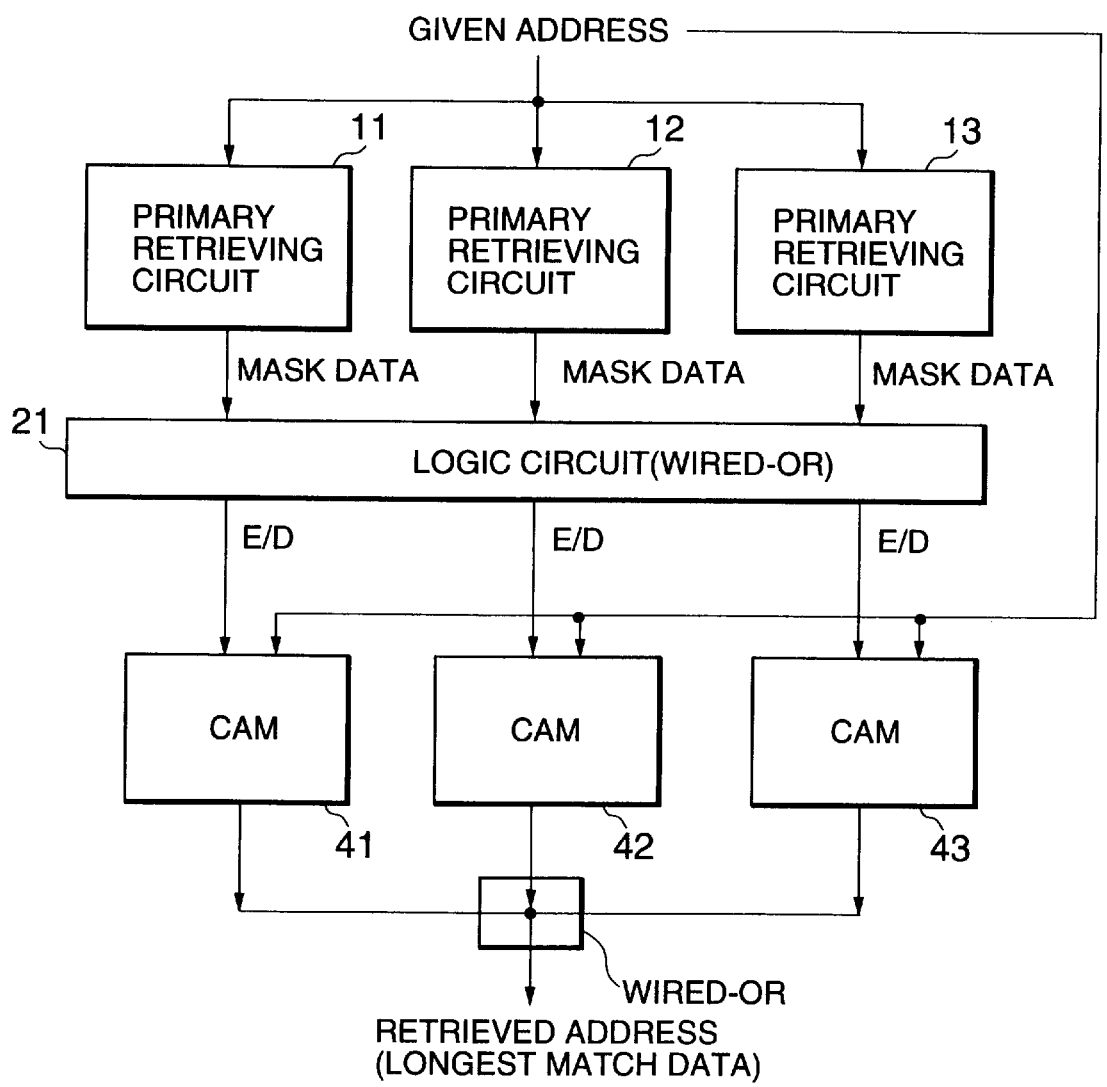
FIG. 9 is a block diagram showing an address retrieving circuit according to a fourth embodiment of the present invention.

Referring to FIG. 9, in the address retrieving circuit 101 of the fourth embodiment, the structure of a logic circuit 21 is different from that of the first embodiment and the stored entries of CAM's 41 to 43 are different from those of the first embodiment. In the fourth embodiment, the entries stored in the CAM's 41 to 43 are the same as the entries stored in the primary retrieving circuits 11 to 13, respectively.

Figure 10:
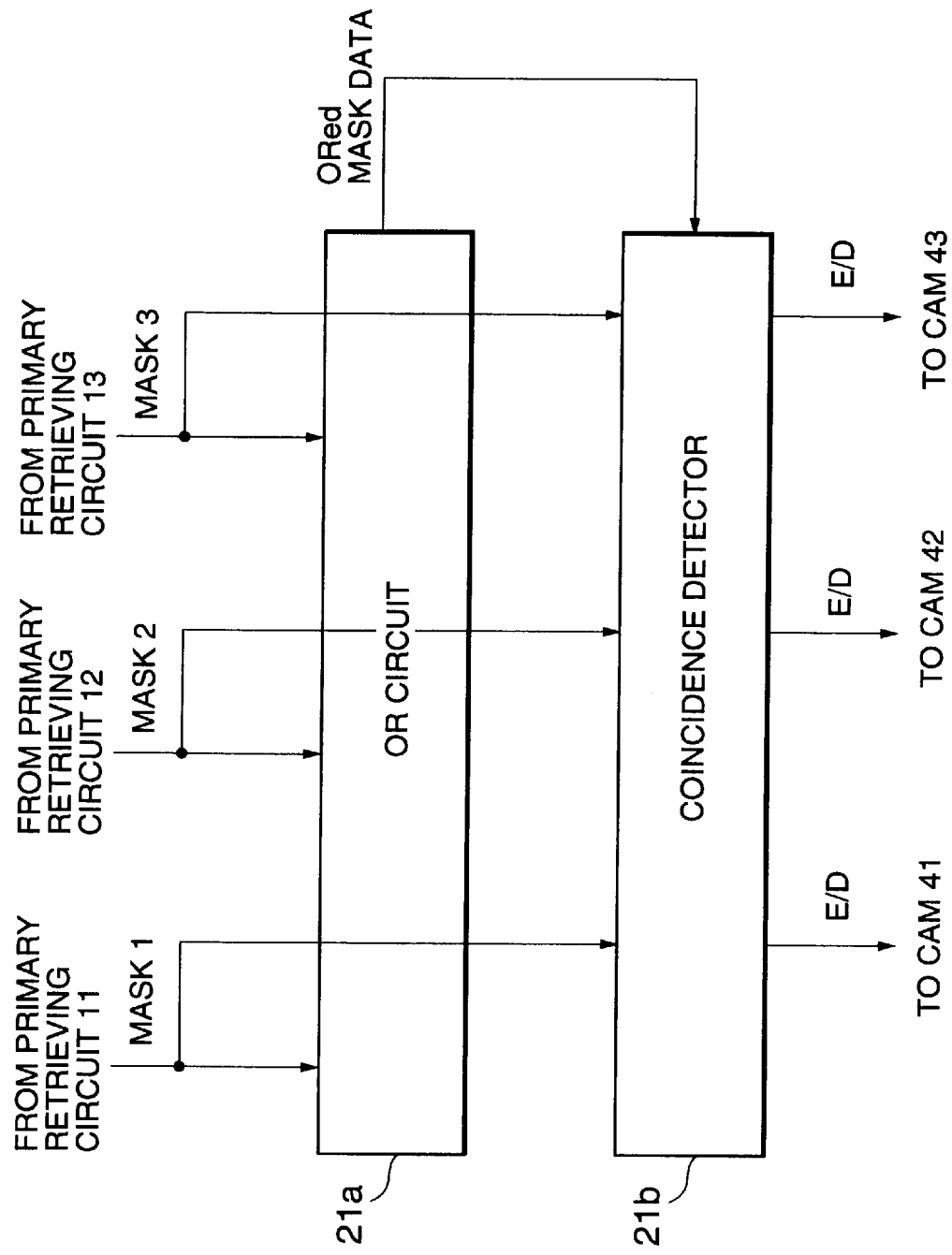
FIG. 10 is a block diagram showing the circuit of a logic circuit of FIG. 9.

As shown in FIG. 10, the logic circuit 21 is composed of an OR circuit 21a and a coincidence detector 21b. The OR circuit 21a is structured by a wired-OR circuit to perform a logical OR function on the mask data MASK1, MASK2, and MASK3 inputted from the primary retrieving circuits 11 to 13, respectively. The coincidence detector 21b compares the mask data MASK1, MASK2, and MASK3 with the obtained (ORed) mask data inputted from the OR circuit 21a to produce enable/disable (e/d) signals corresponding to the primary retrieving circuits 11 to 13, respectively. If the combined mask data coincides with the mask data of a primary retrieving circuit, the coincidence detector 21b outputs an enable signal to the corresponding CAM, and if the combined mask data does not coincide with the mask data, the coincidence detector 21b outputs a disable signal to the corresponding CAM.

When one of the CAM's 41 to 43 has received the enable signal from the coincidence detector 21b, the corresponding one of the CAM's 41 to 43 outputs the content-association data in the entry data coinciding with the given address data. On the other hand, if a disable signal has been received, the operation of the corresponding CAM is stopped.

The operation of the address retrieving circuit 101 according to the fourth embodiment is different from the operation of the first embodiment in the router R1, as will be explained below.

The primary retrieving circuits 11 to 13 are the same as those in the first embodiment, and when (3, 2, 1, 0) has been input as the given address data, the primary retrieving circuits 11 to 13 output the mask data: MASK1 (3, 3, 0, 0), MASK2 (3, 0, 0, 0) and MASK3 (3, 3, 3, 0), respectively, to the OR circuit 21a and the coincidence detector 21b.

The OR circuit 21a performs the logical OR function on the mask data MASK1 (3, 3, 0, 0), MASK2 (3, 0, 0, 0) and MASK3 (3, 3, 3, 0) to produce ORed mask data (3, 3, 3, 0). The coincidence detector 21b compares the ORed mask data (3, 3, 3, 0) to each of the mask data MASK1 (3, 3, 0, 0), MASK2 (3, 0, 0, 0) and MASK3 (3, 3, 3, 0). In this case, the ORed mask data (3, 3, 3, 0) is identical to the mask data MASK3 (3, 3, 3, 0) inputted from the primary retrieving circuit 13 and does not coincide with the other mask data MASK1 (3, 3, 0, 0) and MASK2 (3, 0, 0, 0) inputted from other primary retrieving circuits 11 and 12. Accordingly, the coincidence detector 21b sends a disable signal to the CAM's 41 and 42 and sends an enable signal to the CAM 43.

When receiving the enable signal from the coincidence detector 21b of the logic circuit 21, the CAM 43 reads the data (3, 2, 1, *) as content-association data of the given address (3, 2, 1, 0). On the other hand, the operations of the CAM's 41 and 42 receiving the disable signal are stopped and, no data is output from the CAM's 41 and 42. Accordingly, the output data (3, 2, 1, *) of the CAM 43 directly becomes the final result address (longest match routing information) even if the data is ORed with the output data of the CAM's 41 and 42, and the retrieved address is output from the address retrieving circuit 101.

For expanding the address retrieving circuit 101 according to the fourth embodiment, a primary retrieving circuit and a CAM are added respectively in a manner similar to that of the first embodiment.

As explained above, it is also possible to add easily entry data used to identify the next hop node to which the packet will be sent. Further, since the address retrieving circuit 101 is structured by hardware, the next hop destination of the packet can be determined rapidly.

Fifth Embodiment

The network, the address data and the routers according to the fifth embodiment have structures almost similar to the structures of the first embodiment, except that the structure of the address retrieving circuit 101 is different from that of the first embodiment and a CAM is not needed.

Figure 11:
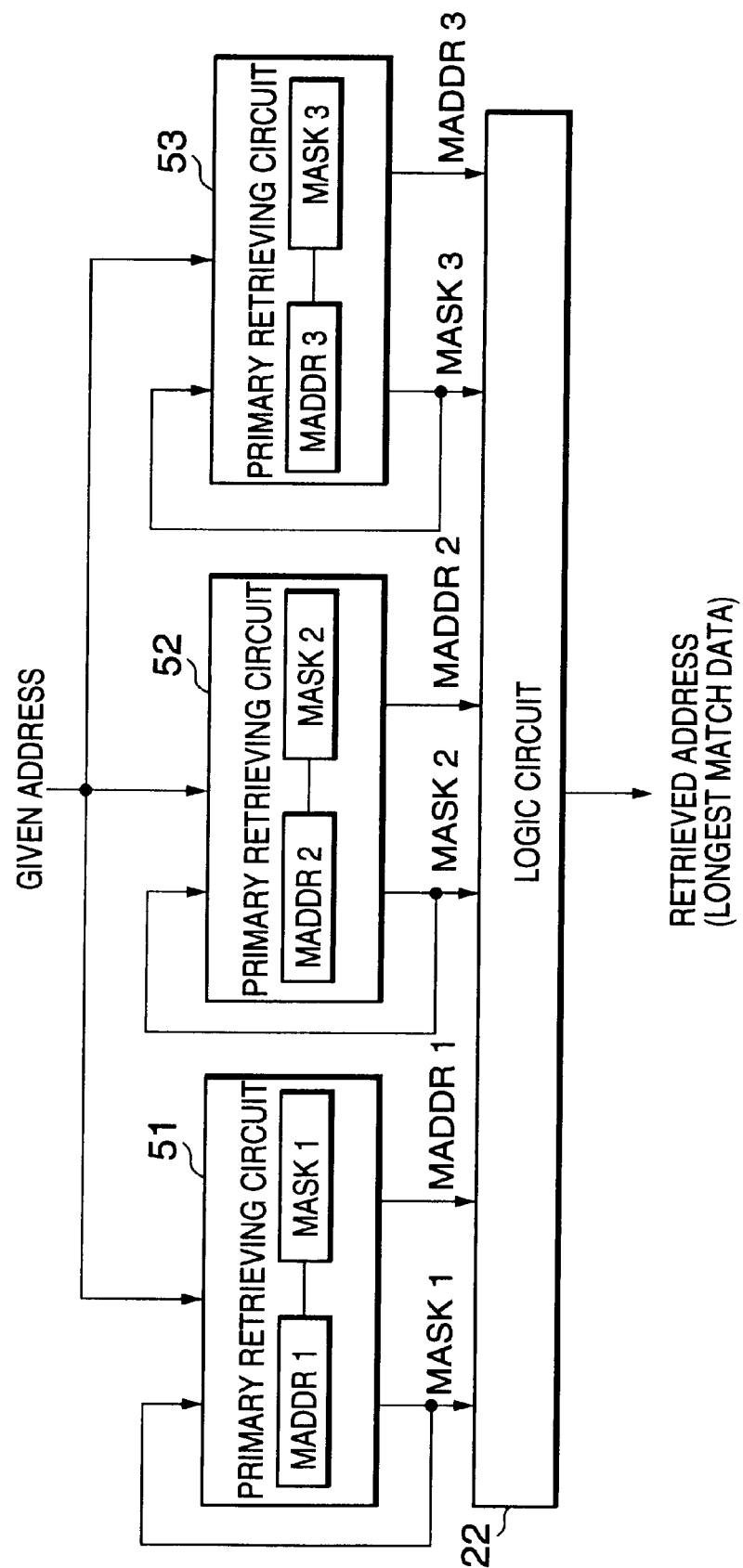
FIG. 11 is a block diagram showing an address retrieving circuit according to a fifth embodiment of the present invention.

Referring to FIG. 11, the address retrieving circuit 101 of the fifth embodiment is composed of primary retrieving circuits 51 and 53 and a logic circuit 22.

Each of the primary retrieving circuits 51 to 53 stores a plurality of masked addresses (entries) MADDR and masks MASK corresponding to each entry as described before. Each of the primary retrieving circuits 51 to 53 compares the given address with each entry as described later, and outputs a mask corresponding to the entry with the longest match bit length among the entries matching to the logic circuit 22.

Further, each of the primary retrieving circuits 51 to 53 inputs the output mask thereof to output the longest match entry as the longest match address to the logic circuit 22. Since the CAM is not provided, the longest match entry is read from each of the primary retrieving circuits 51 to 53 by feeding the output mask data back thereto.

Figure 12:
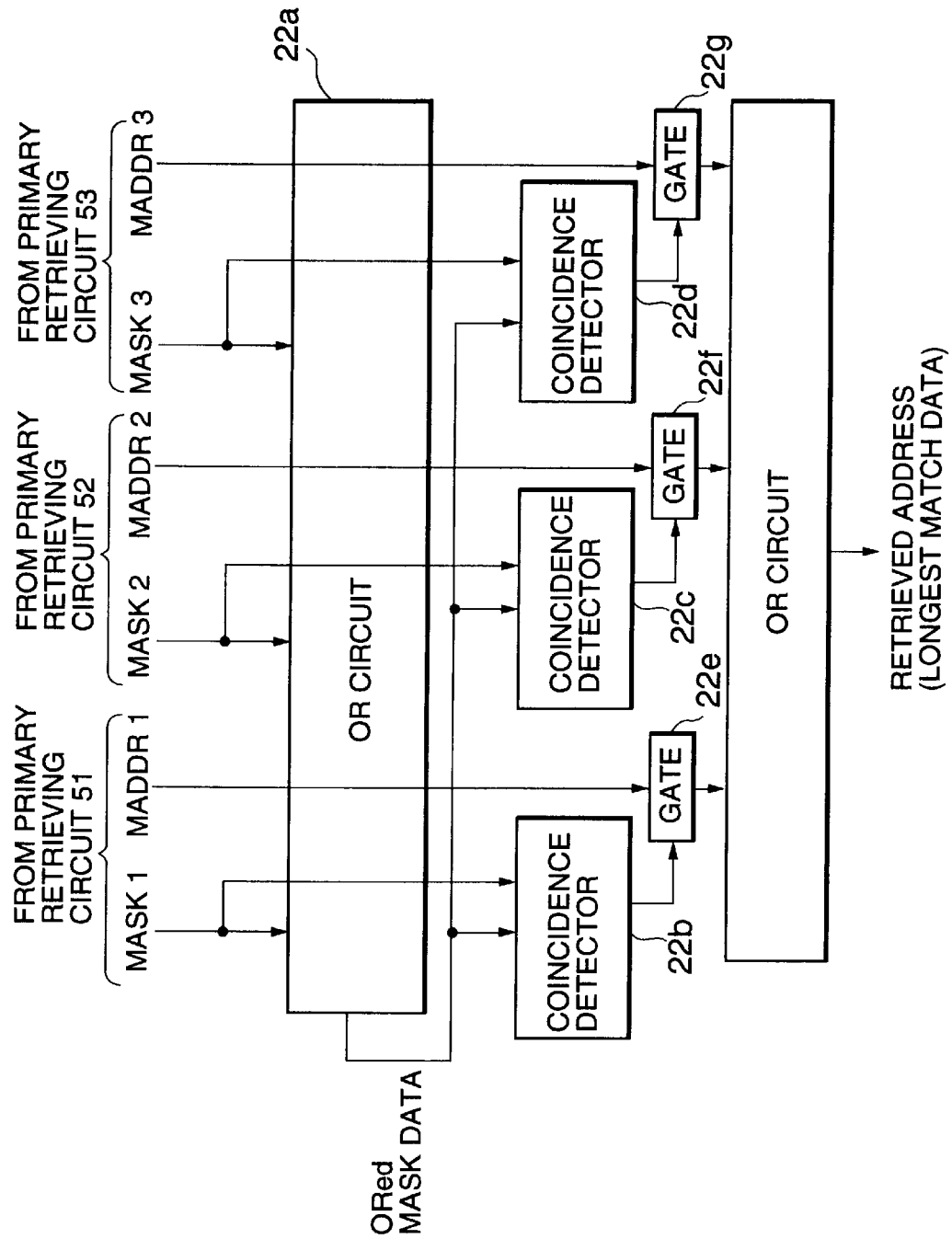
FIG. 12 is a block diagram for showing the circuit of a logic circuit of FIG. 11.

As shown in FIG. 12, the logic current 22 is composed of an OR circuit 22a, coincidence detectors 22b to 22d, gate circuits 22e to 22g, and an OR circuit 22h. The OR circuit 22a may be a wired-OR circuit to perform a logical OR function on the mask data MASK1, MASK2 and MASK3 inputted from the primary retrieving circuits 51 and 53, respectively.

The ORed mask data is output to the coincidence detectors 22b to 22d. In addition to the ORed mask data, each of the coincidence detectors 22b to 22d inputs the mask data MASK and the longest match address data MADDR from the corresponding one of the primary retrieving circuits 51 to 53. The respective coincidence detectors 22a to 22d compare the input mask data MASK1, MASK2 and MASK3 with the ORed mask data inputted from the OR circuits 22a. If both data coincide with each other, each coincidence detector outputs a coincidence signal to the corresponding gate circuit. When receiving the coincidence signal, the corresponding gate circuit is made open to transfer the corresponding longest match address data MADDR to the OR circuit 22h.

The OR circuit 22h may be a wired-OR circuit to perform a logical OR function on the longest match address data MADDR1, MADDR2 and MADDR3 inputted from the primary retrieving circuits 51 and 53 through the gate circuits 22e to 22g, respectively. The OR circuit 22h outputs the final result address (the longest match routing information).

The operation of the address retrieving circuit 101 according to the fifth embodiment is different from that of the first embodiment, as will be explained below.

Figure 13:
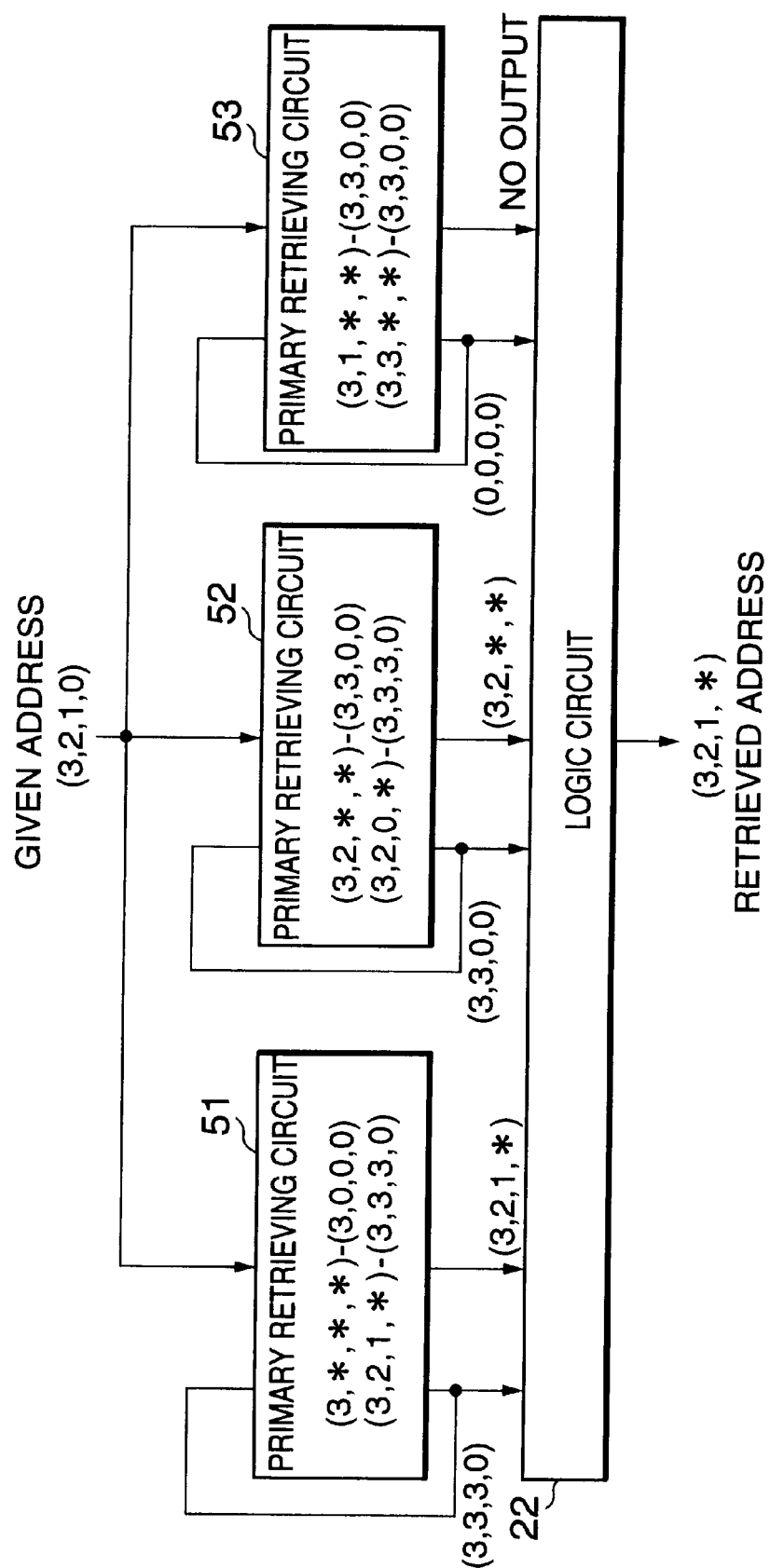
FIG. 13 is a diagram for explaining an operation or the address retrieving circuit according to the fifth embodiment of the present invention.

Referring to FIG. 13, the primary retrieving circuit 51 stores (3, *, *, *) and (3, 2, 1, *) as entry data, and further stores (3, 0, 0, 0) and (3, 3, 3, 0) as mask data corresponding to these entry data, respectively. Similarly, the primary retrieving circuit 52 stores (3, 2, *, *) and (3, 2, 0, *) as entry data, and further stores (3, 3, 0, 0) and (3, 3, 3, 0) as mask data corresponding to these entry data. The primary retrieving circuit 53 stores (3, 1, *, *) and (3, 3, *, *) as entry data, and further stores (3, 3, 0, 0) and (3, 3, 0, 0) as mask data correspondence to these entry data.

In FIG. 13, when (3, 2, 1, 0) has been input as the given address data, the primary retrieving circuits 51 to 53 output the mask data (3, 3, 3, 0), (3, 3, 0, 0) and (0, 0, 0, 0) corresponding to the longest match entry data, respectively, to the logic circuit 22.

The respective mask data (3, 3, 3, 0), (3, 3, 0, 0) and (0, 0, 0, 0) are input to the primary retrieving circuits 51 to 53. When inputting the mask data, the respective primary retrieving circuits 51 and 52 output the longest match address data (3, 2, 1, *) and (3, 2, *, *). However, the primary retrieving circuit 53 does not output the longest match address data because the mask data (0, 0, 0, 0) and no corresponding entry data is found therein.

In the logic circuit 22, as shown in FIG. 12, the OR circuit 22a performs the logical OR function on the mask data (3, 3, 3, 0), (3, 3, 0, 0) and (0, 0, 0, 0) inputted from the primary retrieving circuits 51 to 53, respectively, to output the ORed mask data (3, 3, 3, 0) to the coincidence detectors 22b to 22d.

The coincidence detectors 22b to 22d compare at first the respective mask data (3, 3, 3, 0), (3, 3, 0, 0) and (0, 0, 0, 0) inputted from the primary retrieving circuits 51 to 53 with the ORed mask data (3, 3, 3, 0) inputted from the OR circuit 22a.

In the coincidence detector 22b, since the ORed mask data (3, 3, 3, 0) coincides with the input mask data (3, 3, 3, 0), the coincidence detector 22b outputs the coincidence signal to the gate circuit 22e and thereby the longest match address (3, 2, 1, *) is transferred from the primary retrieving circuit 51 to the OR circuit 22h.

On the other hand, in the coincidence detectors 22c and 22d, since the ORed mask data (3, 3, 3, 0) does not coincide with the input mask data (3, 3, 0, 0) or (0, 0, 0, 0), neither of the circuits 22c and 22d outputs the coincidence signal and thereby the gate circuits 22f and 22g remain closed. Accordingly, the OR circuit 22h outputs the retrieved address data (3, 2, 1, *) inputted from the primary retrieving circuit 51 through the gate circuit 22e as the longest match address data to the switch 103.

For expanding the address retrieving circuit 101 according to the fifth embodiment, a primary retrieving circuit is added and the structure of the logic circuit 22 is expanded to match this addition. More specifically, a pair of coincidence detector and a gate circuit for the added primary retrieving circuit is added to the logic circuit 22 as shown in FIG. 13.

As explained above, it is also possible to add easily entry data which is used to identify the next hop node to which the packet will be sent next. Further, since the address retrieving circuit 101 is structured by hardware, the next destination of the packet can be determined rapidly.

Sixth Embodiment

The network, the address data and the routers according to the sixth embodiment have structures almost similar to the structures of the first embodiment, except that the structure of the address retrieving circuit 101 is different from that of the first embodiment.

Figure 14:
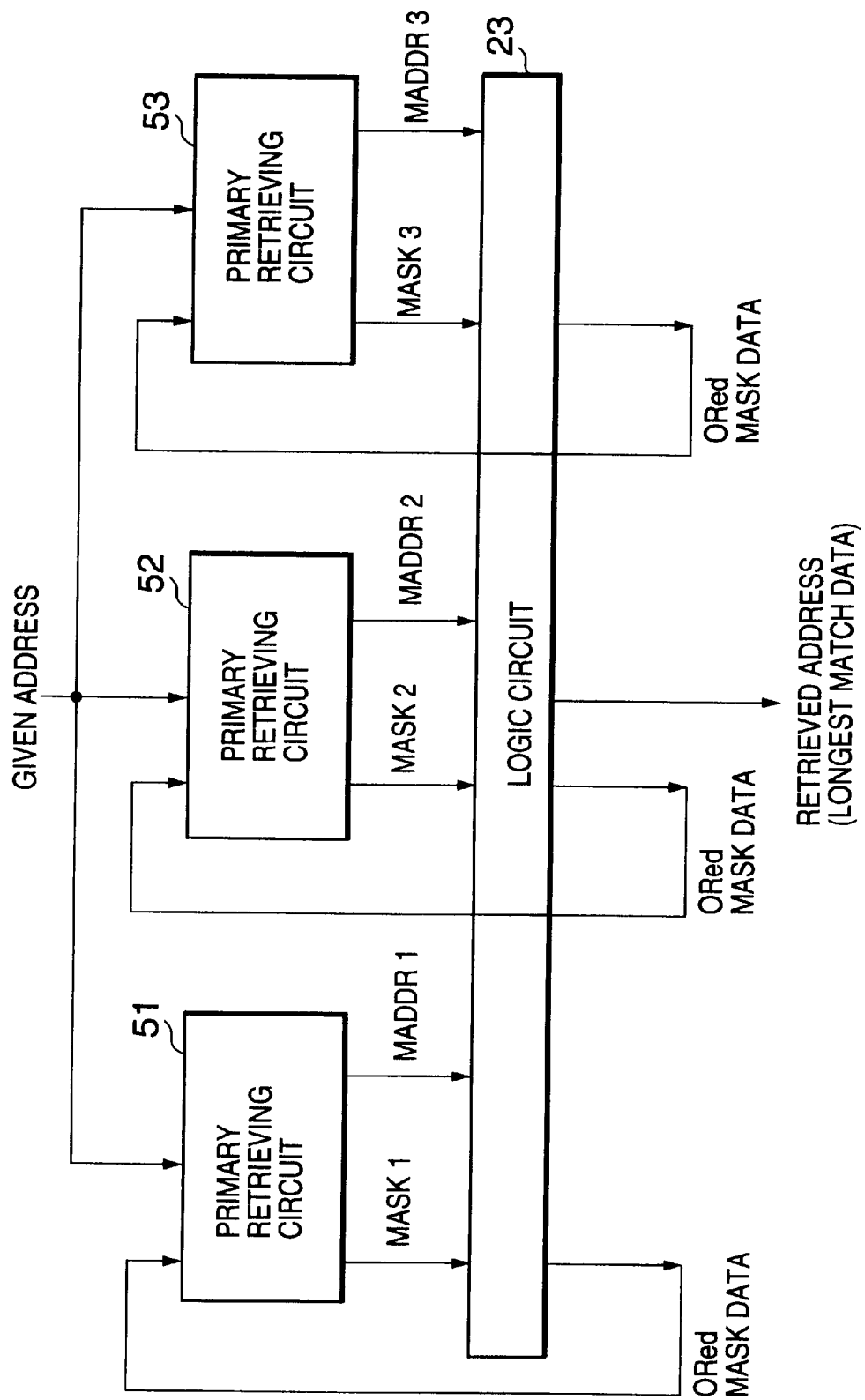
FIG. 14 is a block diagram for showing an address retrieving circuit according to a sixth embodiment of the present invention.

As shown in FIG. 14, the address retrieving circuit 101 of the sixth embodiment is composed of primary retrieving circuits 51 to 53 and a logic circuit 53. The primary retrieving circuits 51 to 53 are the same as those of the fifth embodiment, but in the sixth embodiment, ORed mask data of the logic circuit 23 is output in common to the primary retrieving circuits 51 to 53.

Figure 15:
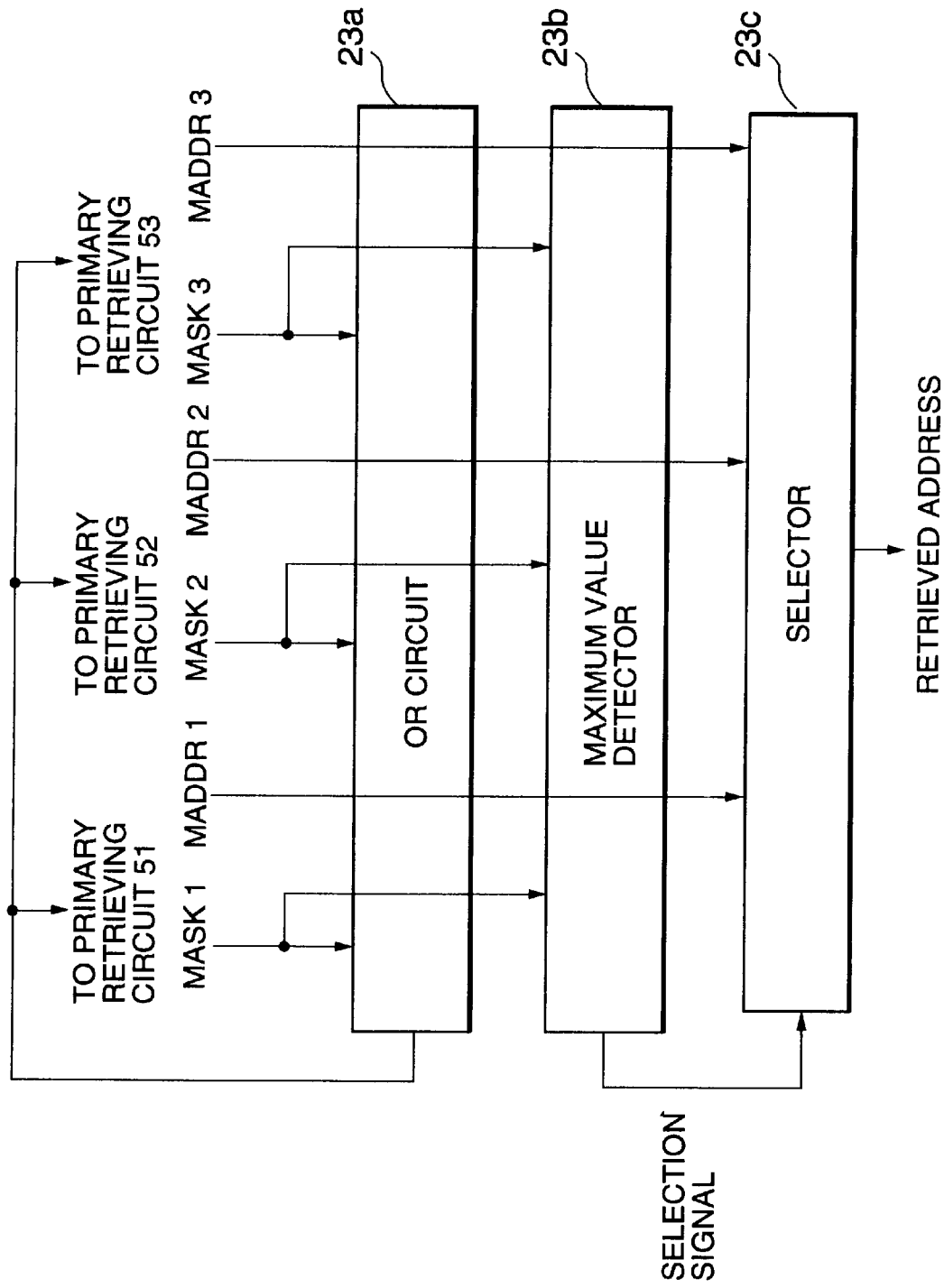
FIG. 15 is a block diagram for showing the circuit of a logic circuit of FIG. 14.

Referring to FIG. 15, the logic circuit 23 is composed of an OR circuit 23a, a maximum value detector 23b, and a selector 23c. The OR circuit 23a performs a logical OR function on the mask data MASK1, MASK2, and MASK3 inputted from the primary retrieving circuits 51 to 53 to produce the ORed mask data, which is input respectively to the primary retrieving circuits 51 to 53. Based on the ORed mask data, the respective primary retrieving circuits 51 to 53 output the longest match address MADDR to the selector 23c.

The maximum value detector 23b detects the maximum data from the mask data MASK1, MASK2, and MASK3 inputted from the primary retrieving circuits 51 to 53, and outputs a selection signal corresponding to the detected mask data to the selector 23c. Based on the selection signal input from the maximum value detector 23b, the selector 23c selects one from the longest match addresses MADDR1, MADDR2, and MADDR3 inputted from the primary detecting circuits 51 to 53, respectively, and outputs the selected one as the retrieved address to the switch 103.

The operation of the address retrieving circuit 101 according to the sixth embodiment is different from that of the first embodiment, as will be described hereinafter.

Figure 16:
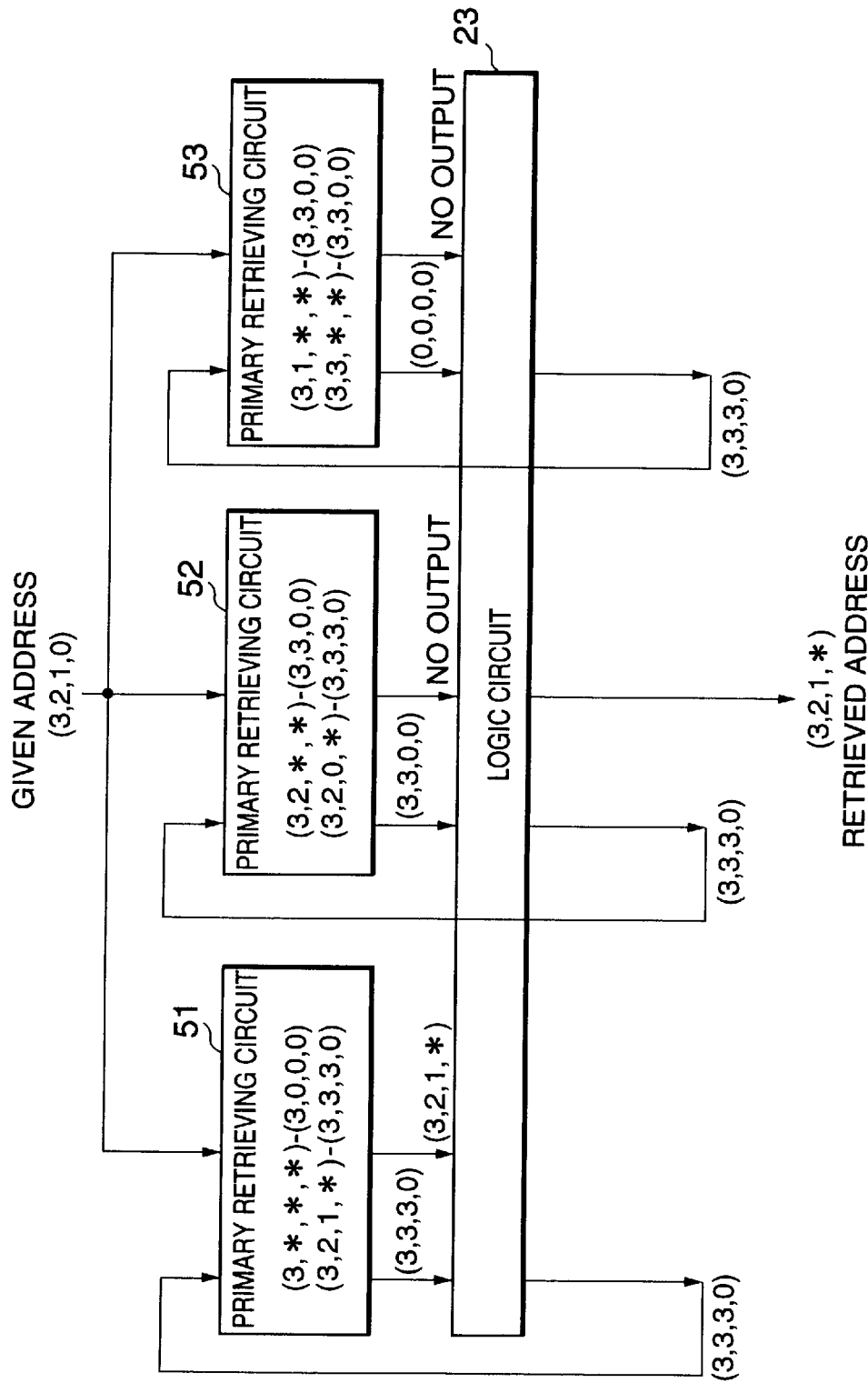
FIG. 16 is a diagram for explaining an operation of the address retrieving circuit according to the sixth embodiment of the present invention.

Referring to FIG. 16, when (3, 2, 1, 0) has been input as the given address data, the respective primary retrieving circuits 51 to 53 output the mask data (3, 3, 3, 0), (3, 3, 0, 0) and (0, 0, 0, 0) corresponding to the longest match entry data to the logic circuit 23.

The OR circuit 23a performs the logical OR function on the mask data (3, 3, 3, 0), (3, 3, 0, 0) and (0, 0, 0, 0) inputted from the primary retrieving circuits 51 to 53, and outputs the result data (3, 3, 3, 0) back to the primary retrieving circuits 51 to 53. Based on the mask data (3, 3, 3, 0), the primary retrieving circuit 51 outputs the longest match address (3, 3, 1, *). On the other hand, the primary retrieving circuits 52 and 53 do not output a longest match address because there is no corresponding entry data.

In the mean time, the maximum value detector 23b detects that (3, 3, 3, 0) becomes a maximum value among the mask data (3, 3, 3, 0), (3, 3, 0, 0) and (0, 0, 0, 0) inputted from the primary retrieving circuits 51 to 53, and outputs the selection signal for selecting the longest match address corresponding to the maximum value (3, 3, 3, 0) to the selector 23c, the selector 23c selects the address (3, 2, 1, *) as the retrieved address.

For expanding the address retrieving circuit 101 according to the sixth embodiment, a primary retrieving circuit is added and the structure of the logic circuit 23 is expanded to match this addition. More specifically, the maximum value detector 23b and the selector 23c are modified such that the added address can be selected.

As explained above, it is also possible to add easily entry data which is used to identify the next hop node to which the packet will be sent next. Further, since the address retrieving circuit 101 is structured by hardware, the next destination or the packet can be determined rapidly.

Seventh Embodiment

The network, the address data and the routers according to the seventh embodiment have structures almost similar to the structures of the first embodiment, except that the structure of the address retrieving circuit 101 is different from that of the first embodiment.

Figure 17:
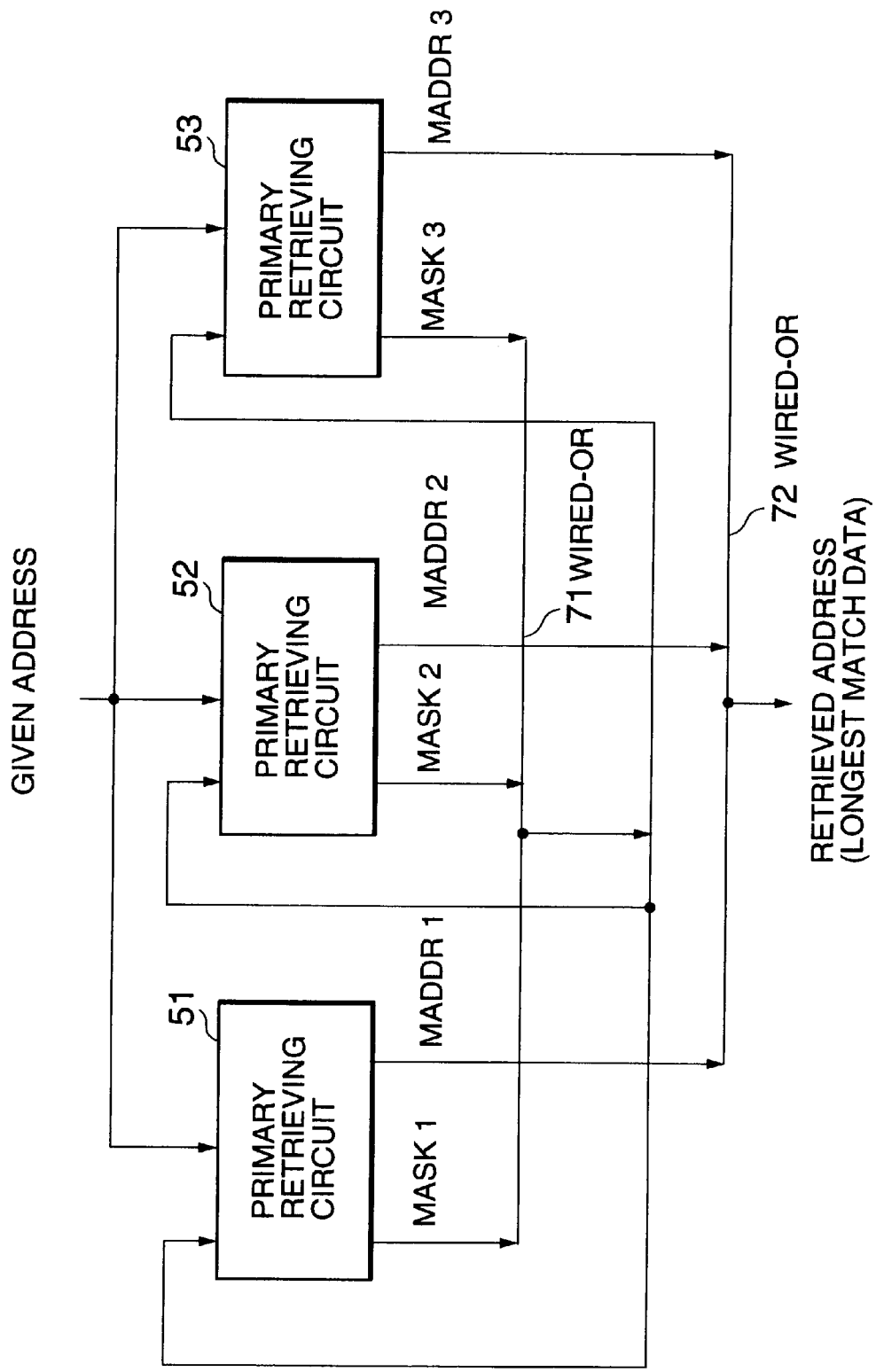
FIG. 17 is a block diagram showing an address retrieving circuit according to a seventh embodiment of the present invention.

As shown in FIG. 17, the address retrieving circuit 101 according to the seventh embodiment is composed of primary retrieving circuits 51 to 53 and wired-OR circuits 71 and 72. The primary retrieving circuits 51 and 53 are the some as those of the fifth embodiment.

The wired-OR circuit 71 performs a logical OR function on the mask data MASK1, MASK2, and MASK3 output from the primary retrieving circuits 51 to 53, respectively, and the results is output to the primary retrieving circuits 51 to 53, as described in the sixth embodiment. The wired-OR circuit 72 performs a logical OR function on the longest match addresses MADDR1, MADDR2, and MADDR3 output from the primary retrieving circuits 51 to 53, respectively, and the result is output to the switch 103 as the retrieved address (the longest match routing information).

For expanding the address retrieving circuit 101 according to the seventh embodiment, a primary retrieving circuit is added, and the added primary retrieving circuit is connected by wiring so that the above logical OR functions are performed by the wired-OR circuits 71 and 72.

According to the seventh embodiment, it is possible to add entry data which is used to identify the next hop node to which the packet will be sent next because of only addition of a primary retrieving circuit and wiring for wired-OR. Therefore, the entry data can be added much more easily than in the circuits according to the first to sixth embodiments. Further, since the address retrieving circuit 101 is structured by hardware, the next destination of the packet can be determined rapidly.

Eighth Embodiment

The network, the address data and the routers according to the eighth embodiment have structures almost similar to the structures of the first embodiment, except that the structure of the address retrieving circuit 101 is different from that of the first embodiment.

Figure 18:
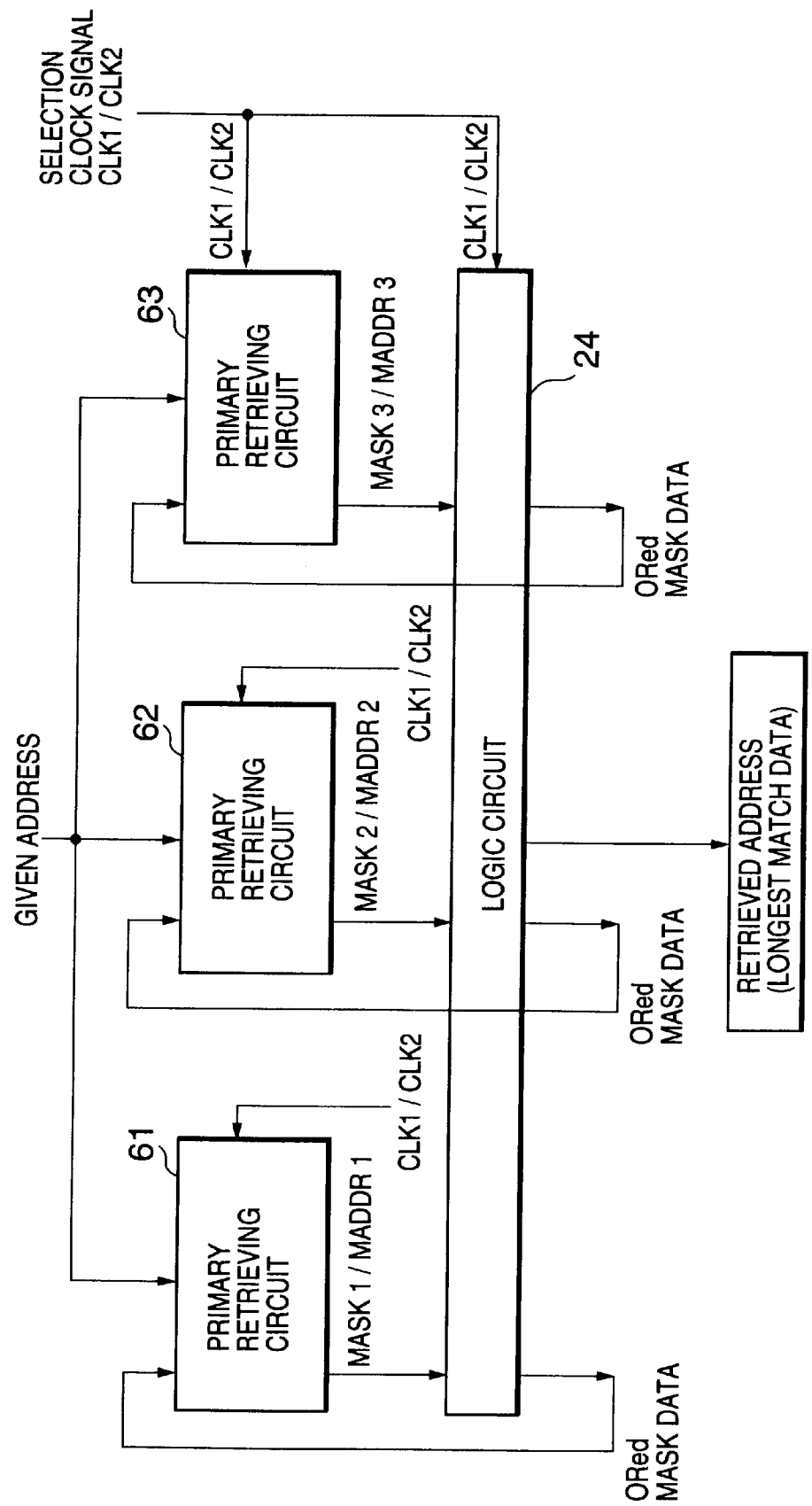
FIG. 18 is a block diagram showing an address retrieving circuit according to an eighth embodiment of the present invention.

As shown in FIG. 18, the address retrieving circuit 101 of the eighth embodiment is composed of primary retrieving circuits 61 to 63 and a logic circuit 24. The respective primary retrieving circuits 61 to 63 store the masked address data MADDR as entry data and mask data MASK corresponding to each entry. In other words, each of the primary retrieving circuits 61 to 63 stores the entry data MADDR and the mask data MASK, which are the same as those of the primary retrieving circuits 11 to 13 of the first embodiment.

According to the eighth embodiment, the respective primary retrieving circuits 61 to 63 compare the given address data with the entry data as described later. Then, when a first clock signal (hereinafter to be called a selection clock signal CLK1) has been input, the respective primary retrieving circuits 61 to 63 output mask data MASK1, MASK2, and MASK3 corresponding to the longest match entry data. When a second clock (hereinafter to be called a selection clock signal CLK2) has been input, the respective primary retrieving circuits 61 and 63 output entry data corresponding to the mask data inputted from the logic circuit 24.

Figure 19:
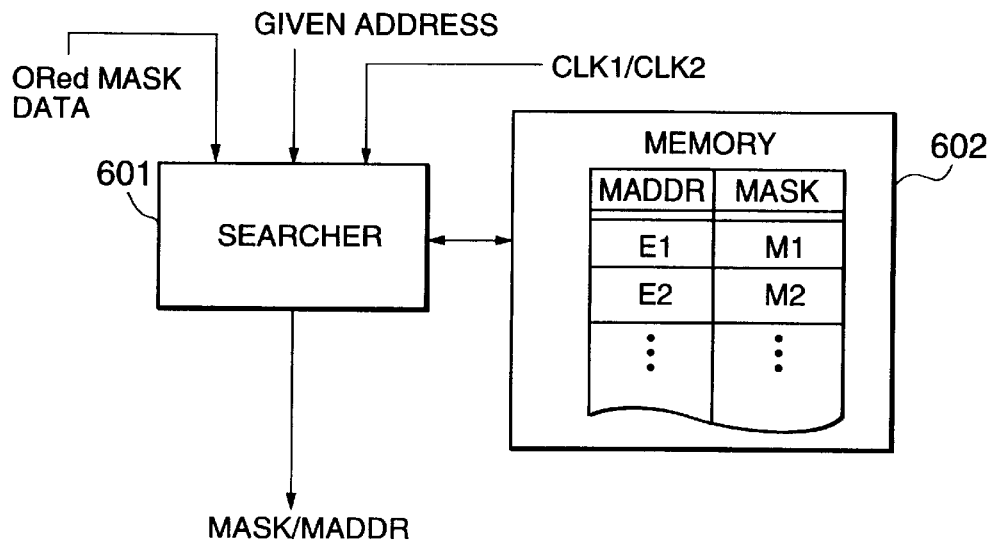
FIG. 19 is a block diagram for showing the circuit of a primary retrieving circuit of FIG. 18.

As shown in FIG. 19, each of the primary retrieving circuits 61 to 63 is composed of a searched 601 and a memory 602. The searcher 601 selects one of the given address data and the ORed mask data inputted from the logic circuit 24 depending on the selection clock signal CLK1/CLK2 and then searches the memory 602 for selected retrieval data. The memory 602 stores the masked address data MADDR: E1, E2, . . . as entry data, and mask data MASK: M1, M2, . . . corresponding to each entry data as described before.

It should be noted that the primary retrieving circuit of the first embodiment as shown in FIG. 2 may be composed of only the memory 602 of a combination of the searcher 601 and the memory 602, and further that the primary retrieving circuit of the fifth embodiment as shown in FIG. 11 may be composed of a combination of the searcher 601 and the memory 602.

Figure 20:
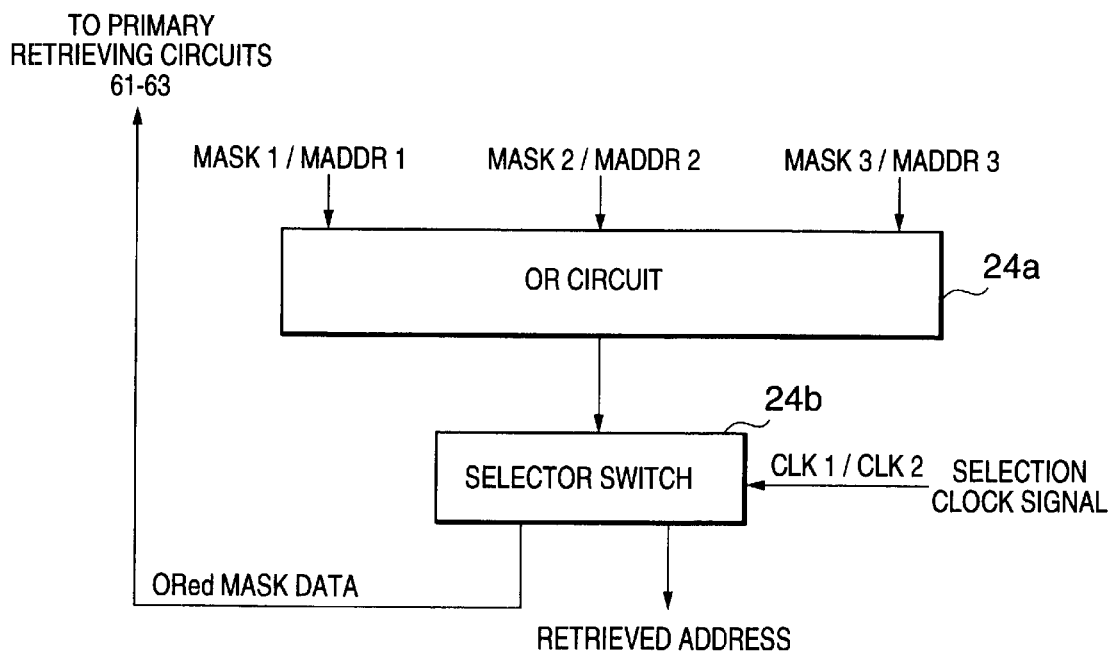
FIG. 20 is a block diagram for showing the circuit of a logic circuit of FIG. 18.

As shown in FIG. 20, the logic circuit 24 is composed of an OR circuit 24a and a selector switch 24b which selects one of two output terminals thereof depending on the selection clock signal CLK1/CLK2. The OR circuit 24a may be a wired-OR circuit. The selector switch 24b selects one output terminal connected to the primary retrieving circuits 61 to 63 when the selection clock signal is CLK1 and selects the other output terminal connected to the switch 103 when the selection clock signal is CLK2. Since the respective mask data MASK1, MASK2, and MASK3 are output from the primary retrieving circuits 61 to 63 when the selection clock signal is CLK1, the ORed mask data obtained by the OR circuit 24a is output to the primary retrieving circuits 61 to 63 through the selector switch 24b. On the other hand, since the respective longest match addresses MADDR1, MADDR2, and MADDR3 are output from the primary retrieving circuits 61 to 63 when the selection clock signal is CLK2, the ORed address data obtained by the OR circuit 24a is output as the retrieved address to the switch 103 through the selector switch 24b.

It is assumed that the CLK1 and the CLK2 have sufficiently large length as compared with propagation delay of the output data in the primary retrieving circuits 61 to 63 and the logic circuit 24.

The operation of the address retrieving circuit 101 according to the eighth embodiment is different from that of the first embodiment as will be explained below.

Figure 21:
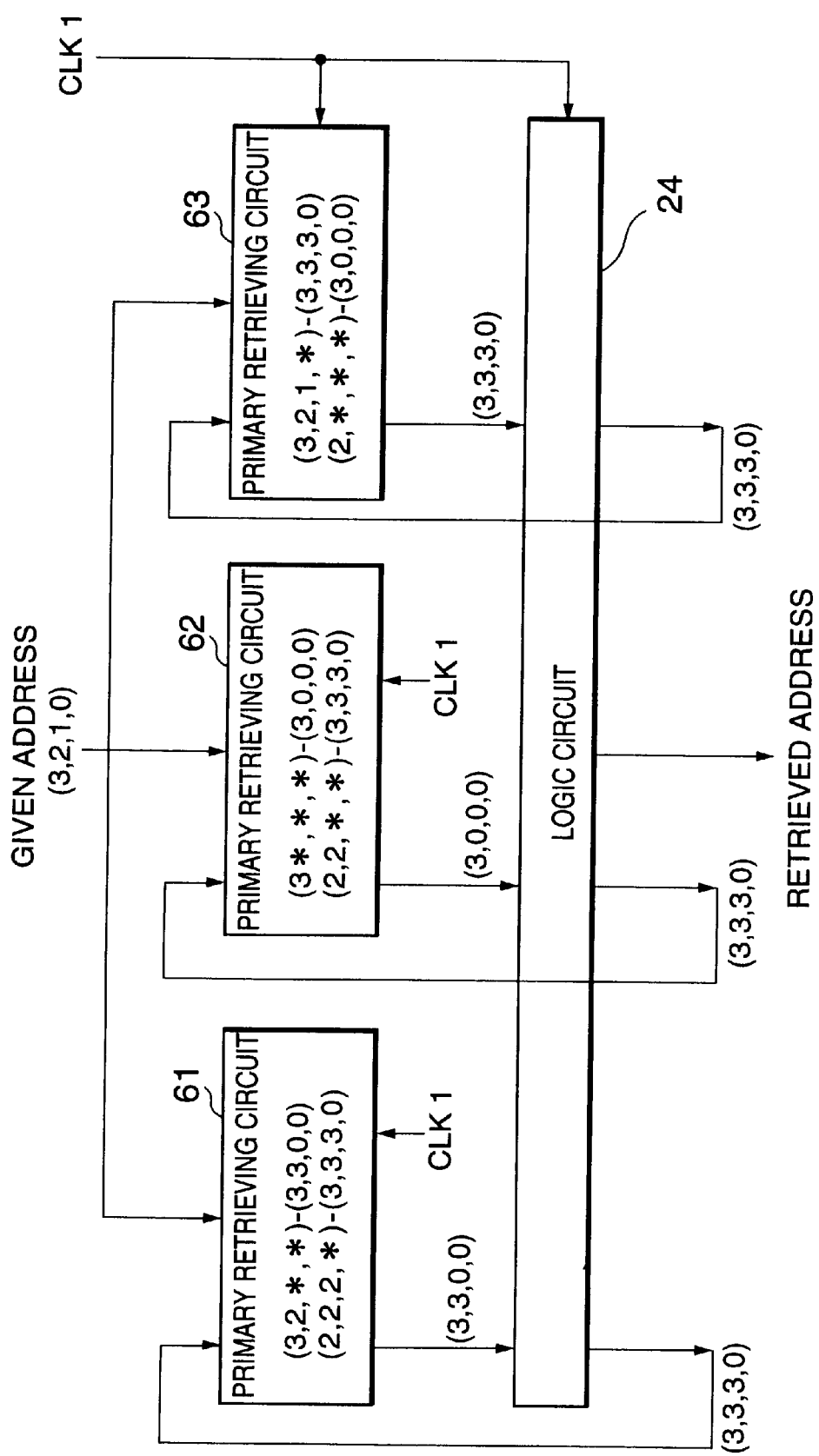
FIG. 21 is a diagram for explaining an operation of the address retrieving circuit according to the eighth embodiment of the present invention when receiving a first clock signal CLK1.

Referring to FIG. 21, when (3, 2, 1, 0) has been input as the given address data in the case of the CLK1, the respective primary retrieving circuits 61 to 63 output the mask data (3, 3, 3, 0), (3, 3, 0, 0) and (0, 0, 0, 0) corresponding to the longest match entry data.

A logical OR of the mask data (3, 3, 3, 0), (3, 3, 0, 0) and (0, 0, 0, 0) is taken by the logic circuit 24, and the resultant data (3, 3, 3, 0) is output as the ORed mask data to the primary retrieving circuits 61 to 63, respectively.

As shown in FIG. 22, when the selection clock signal is switched to the CLK2, the primary retrieving circuit 63 outputs the longest match data (3, 2, 1, *) according to the ORed mask data (3,3,3,0) inputted from logic circuit 24 at the timing of the CLK1. On the other hand, the primary retrieving circuits 61 and 62 output nothing because there is not found entry data corresponding to both the ORed mask data and the given address (3, 2, 1, 0). Therefore, data (3, 2, 1, *) is output as the retrieved address to the switch 103.

For expanding the address retrieving circuit 101 according to the eighth embodiment, a primary retrieving unit is added and the structure of the logic circuit 24 is expanded to match this addition.

As explained above, it is also possible to add easily entry data which is used to identify the next hop node to which the packet will be sent next. Further, since the address retrieving circuit 101 is structured by hardware, the next destination of the packet can be determined rapidly.

Modification

The present invention is not limited to the first to eight embodiments, and various modifications are possible. Modifications of the first to eight embodiments will be explained below.

In the first to eight embodiment, an OR circuit is structured by using a wired-OR circuit. However, the OR circuit may also be structured by a combination of active elements such as transistors and diodes.

In the first to four and eight embodiments, the OR circuit is used for the logic circuits 21 and 24. However, for the logic circuits 21 and 24, there may also be used a circuit for outputting the largest value of input data or an AND circuit (negative logic). An open drained vector may be connected in bus configuration and the bus may be pulled up.

In the first to eight embodiments, the given address data is structured by eight bits separated at each two bits. Mask data also has two bits as a unit. However, the number of bits structuring the address data as the given address data may be set to a desired value. The unit of the mask data is not limited to two bits, but any desired number of bits including one bit or above can be used.

As explained above, according to the present invention, it is possible to carry out the retrieval of the longest match routing information from entry address data at high speed. Further, entry data can also be expanded easily.

What is claimed is:

1. A device for retrieving a longest routing match to a given address from a plurality of entries containing routing information in a router, the device comprising:

a plurality of primary retrieving circuits each of which comprises a memory storing at least one first entry and a mask associated therewith, wherein each of the primary retrieving circuits retrieves a primary match entry which is a longest match to the given address and outputs a primary match mask associated with the primary match entry;

a selector performing a logical OR operation for selecting a longest match mask from the primary match masks output by the primary retrieving circuits, the longest match mask having a longest non-masking bit length among the primary match masks; and at least one associative memory storing a plurality of second entries, each of which is formed by coupling a first entry with a corresponding mask together, wherein the associative memory compares a combination of the given address and the longest match mask to the plurality of second entries and outputs corresponding to a first entry included in a second entry accessed as the longest routing match.

2. A device for retrieving a longest routing match to a given address from a plurality of entries containing information in a router, the device comprising:

a plurality of primary retrieving circuits each of which comprises a memory storing at least one first entry and a mask associated therewith, wherein each of the primary retrieving circuits retrieves a primary match entry which is a longest match to the given address and outputs a primary match mask associated with the primary match entry;

a logic circuit for selecting a longest match mask from the primary match masks output by the primary retrieving circuits, the longest match mask having a longest non-masking bit length among the primary match masks; wherein the logic circuit comprises an OR circuit performing a logical OR function on the primary match masks to produce the longest match mask;

at least one associative memory storing a plurality of second entries, each of which is formed by coupling a first entry with a corresponding mask together, wherein the associative memory compares a combination of the given address and the longest match mask to the plurality of second entries and outputs corresponding to a first entry included in a second entry accessed as the longest routing match.

3. The device according to claim 2, wherein the OR circuit is a wired-OR circuit.

4. The device according to claim 1, wherein the logic circuit comprises a maximum value detector for detecting a maximum value as the longest match mask to the given address from the primary match masks.

5. The device according to claim 1, wherein a single associative memory stores the plurality of second entries corresponding to the plurality of entries stored in the primary retrieving circuits.

6. The device according to claim 1 further comprising, a plurality of associative memories each storing at least one second entry, each of which is formed by coupling an entry with a corresponding mask, wherein each of the associative memories outputs an entry of a second entry associated with the combination of the given address and the longest match mask; and a combiner for combining entries output from the associative memories to produce the longest routing match.

7. The device according to claim 6, wherein the number of associative memories correspond to the number of primary retrieving circuits.

8. A device for retrieving a longest routing match to a given address from a plurality of entries corresponding to routing information in a router, the device comprising:

a plurality of primary retrieving circuits each of which comprises a memory storing at least one first entry and a mask associated therewith so that the primary retrieving circuits store the plurality of first entries, wherein each of the primary retrieving circuits retrieves a primary match entry which is a longest match to the given address and outputs the mask associated with the primary match entry;

a plurality of associative memories each corresponding to a respective primary retrieving circuit, each of the associative memories storing said at least one first entry from the respective primary retrieving circuit, wherein each of the associative memories outputs data corresponding to the entry associated with the given address;

a selector performing a logical OR operation for selectively enabling the associative memories depending on which primary match mask output by the primary retrieving circuits has a longest non-masking bit length; and a combiner for combining the output data of each enabled associative memory to produce the longest routing match.

9. A device for retrieving a longest routing match to a given address from a plurality of entries corresponding to routing information in a router, the device comprising:

a plurality of primary retrieving circuits each of which comprises a memory storing at least one first entry and a mask associated therewith so that the primary retrieving circuits store the plurality of first entries, wherein each of the primary retrieving circuits retrieves a primary match entry which is a longest match to the given address and outputs the mask associated with the primary match entry;

a plurality of associative memories each corresponding to a respective primary retrieving circuit, each of the associative memories storing said at least one first entry from the respective primary retrieving circuit, wherein each of the associative memories outputs data corresponding to the entry associated with the given address;

a logic circuit for selectively enabling the associative memories depending on which primary match mask output by the primary retrieving circuits has a longest non-masking bit length; wherein the logic circuit comprises:

an OR circuit performing a logical OR function on the primary match masks to produce a combined mask, a coincidence detector for detecting coincidence between the combined mask and each of the primary match masks to produce an enabling signal which is used to enable a corresponding associative memory; and a combiner for combining the output data of each enabled associative memory to produce the longest routing match.

10. A device for retrieving a longest routing match to a given address from a plurality of entries which are routing information in a router, the device comprising:

a plurality of primary retrieving circuits each comprising:

a memory storing at least one entry and a mask associated therewith; and a searcher searching the memory for an entry which is a longest match to the given address and outputting the mask associated with the entry which is the longest match and further searching the memory for a primary match entry matching the output mask;

a selector performing a logical OR operation selecting a longest match mask from the masks input from the primary retrieving circuits, the longest match mask having a longest non-masking bit length among the masks; and a second logic circuit selecting a longest match entry from the primary match entries input from the primary retrieving circuits based on the longest match mash and outputting the longest match entry as the longest routing match.

11. A device for retrieving a longest routing match to a given address from a plurality of entries which are routing information in a router, the device comprising:

a plurality of primary retrieving circuits each comprising:

a memory storing at least one entry and a mask associated therewith;

a searcher searching the memory for an entry which is a longest match to the given address and outputting the mask associated with the entry which is the longest match and further searching the memory for a primary match entry matching the output mask;

a first logic circuit selecting a longest match mask from the masks input from the primary retrieving circuits, the longest match mask having a longest non-masking bit length among the masks, wherein;

the first logic circuit is an OR circuit performing a logical OR function on the primary match masks input from the primary retrieving circuits; and a second logic circuit selecting a longest match entry from the primary match entries input from the primary retrieving circuits based on the longest match mash and outputting the longest match entry as the longest routing match.

12. The device according to claim 10, wherein the second logic circuit comprises:

a coincidence detector for each of the primary retrieving circuits, each coincidence detector detecting a coincidence between the longest match mask and each of the primary match entries; and a gate for each of the primary retrieving circuits, each gate outputting a corresponding primary match entry input from the primary retrieving circuit as the longest routing match when the coincidence is detected.

13. A device for retrieving a longest routing match to a given address from a plurality of entries corresponding to routing information in a router, the device comprising:

a plurality of primary retrieving circuits each comprising:

a memory storing at least one entry and a mask associated therewith; and a searcher searching the memory for an entry which is a longest match to the given address and outputting the mask associated with the entry which is the longest match and further searching the memory for a primary match entry matching the output mask;

a selector performing a logical OR operation selecting a longest match mask from the masks input from the primary retrieving circuits and outputting the longest match mask as the mask input to the primary retrieving circuits so that each of the primary retrieving circuits outputs the primary match entry associated with the longest match mask, the longest match mask having a longest non-making bit length among the masks; and a second logic circuit selecting a longest match entry from the primary match entries input from the primary retrieving circuits based on the longest match mask and outputting the longest match entry as the longest routing match.

14. A device for retrieving a longest routing match to a given address from a plurality of entries corresponding to routing information in a router, the device comprising:

a plurality of primary retrieving circuits each comprising:

a memory storing at least one entry and a mask associated therewith;

a searcher searching the memory for an entry which is a longest match to the given address and outputting the mask associated with the entry which is the longest match and further searching the memory for a primary match entry matching the output mask;

a first logic circuit selecting a longest match mask from the masks input from the primary retrieving circuits and outputting the longest match mask as the mask input to the primary retrieving circuits so that each of the primary retrieving circuits outputs the primary match entry associated with the longest match mask, the longest match mask having a longest non-making bit length among the masks;

a second logic circuit selecting a longest match entry from the primary match entries input from the primary retrieving circuits based on the longest match mask and outputting the longest match entry as the longest routing match; and the first logic circuit is an OR circuit performing a logical OR circuit performing a logical OR function on the primary match masks to produce the longest match mask.

15. The device according to claim 13, wherein the second logic circuit comprises:

a maximum value detector for detecting a maximum value from the primary match masks to produce a selection signal indicating which primary match mask has the maximum value; and a selector for selecting one of the primary match entries input from the primary retrieving circuits based on the selection signal to produce the longest match entry as the longest routing match.

16. A device for retrieving a longest routing match to a given address from a plurality of entries corresponding to routing information in a router, the device comprising:

a plurality of primary retrieving circuits each comprising:
a memory storing at least one entry and a mask associated therewith;
a searcher searching the memory for an entry which is a longest match to the given address and outputting the mask associated with the entry which is the longest match and further searching the memory for a primary match entry matching the output mask;
a first logic circuit selecting a longest match mask from the masks input from the primary retrieving circuits and outputting the longest match mask as the mask input to the primary retrieving circuits so that each of the primary retrieving circuits outputs the primary match entry associated with the longest match mask, the longest match mask having a longest non-making bit length among the masks, wherein;
the first logic circuit is an OR circuit performing a logical OR function on the primary match masks to produce the longest match masks;
a second logic circuit selecting a longest match entry from the primary match entries input from the primary retrieving circuits based on the longest match mask and outputting the longest match entry as the longest routing match; and, wherein
the second logic circuit is an OR circuit performing a logical OR function on the primary match entries to produce the longest match entry.

17. A device for retrieving a longest routing match to a given address from a plurality of entries corresponding to routing information in a router, the device comprising:

a plurality of primary retrieving circuits each comprising:
a memory storing at least one first entry and a mask associated therewith; and
a searcher searching the memory for an entry which is a longest match to the given address and outputting the primary match mask associated with the first entry which is the longest match when a selection clock signal is in a first state and searching the memory for a primary match entry matching to an input mask when the selection clock signal is in a second state; and
a selector performing a logical OR operation selecting a longest match mask from the primary match masks input from the primary retrieving circuits when the selection clock signal is in the first state and outputting the longest mask as the mask input to the primary retrieving circuits so that each of the primary retrieving circuits outputs the primary match entry associated with the longest match mask, the longest match mask having a longest non-masking bit length among the masks and, when the selection clock signal is in the second state, selecting a longest match entry from primary match entries input from the primary retrieving circuits based on the longest match mask and outputting the longest match entry as the longest routing match.

18. A device for retrieving a longest routing match to a given address from a plurality of entries corresponding to routing information in a router, the device comprising:

a plurality of primary retrieving circuits each comprising:
a memory storing at least one first entry and a mask associated therewith;
a searcher searching the memory for an entry which is a longest match to the given address and outputting the primary match mask associated with the first entry which is the longest match when a selection clock signal is in a first state and searching the memory for a primary match entry matching to an input mask when the selection clock signal is in a second state;
a logic circuit selecting a longest match mask from the primary match masks input from the primary retrieving circuits when the selection clock signal is in the first state and outputting the longest match mask as the mask input to the primary retrieving circuits so that each of the primary retrieving circuits outputs the primary match entry associated with the longest match mask, the longest mask having a longest non-masking bit length among the masks and, when the selection clock signal is in the second state, selecting a longest match entry from primary match entries input from the primary retrieving circuits based on the longest match mask and outputting the longest match entry as the longest routing match, wherein the logic circuit comprises:
an OR circuit performing a logical OR function on outputs of the primary retrieving circuits to produce combined outputs; and
a selector switch switching a destination of the combined outputs depending on the selection clock signal such that the combined outputs are transferred to the primary retrieving circuits when the selection clock signal is in the first state and are output as the longest match entry when the selection clock signal is in the second state.

19. A method for retrieving a longest routing match to a given address from a plurality of entries each entry being routing information in a router, the method comprising:

dividing the plurality of entries into a plurality of primary retrieving circuits, each comprising a memory storing at least one first entry with a mask associated therewith;
retrieving a primary match entry which is a longest match to the given address to produce a primary match mask associated with the primary match entry;
performing a logical OR function to select a longest match mask from primary match masks obtained by the primary retrieving circuits, the longest match mask having a longest non-masking bit length among the primary match masks;
storing a plurality of second entries in at least one associative memory, each of the second entries being formed by coupling an entry with a corresponding mask together; and
accessing a second entry associated with a combination of the given address and the longest mask and outputting an entry included in the second entry accessed as the longest match.

20. A method for retrieving a longest routing match to a given address from a plurality of entries corresponding to routing information in a router, the method comprising:

dividing the plurality of entries into a plurality of primary retrieving circuits each comprising a memory storing at least one entry and a mask associated therewith;
retrieving an entry which is a longest match to the given address and outputting the mask associated with the entry;
performing a logical OR function to select a longest match mask from the output masks, the longest match mask having a longest non-masking bit length among the output masks;

storing a plurality of coupled records in a plurality of associative memories, each of the coupled records being formed by coupling the entry and a corresponding mask;

selectively enabling the associative memories based on the mask having the longest non-masking bit length among the output masks; and combining a coupled record output from each enabled associative memory to produce the longest routing match.

21. A method for retrieving a longest routing match to a given address from a plurality of entries corresponding to routing information in a router, the method comprising:

storing the plurality of entries in a plurality of primary retrieving circuits each of the primary retrieving circuits having a memory storing at least one entry with a corresponding mask;

searching the memory for an entry which is a longest routing match to the given address and outputting a primary mask match;

performing a logical OR function to select a longest match mask from the primary match masks input from the primary retrieving circuits, the longest match mask having the longest non-masking bit length among the primary match masks; and selecting a longest match mask from the primary match masks input from the primary retrieving circuits, depending on which primary mask is the longest match mask to output the longest match entry as the longest match.

22. A method for retrieving a longest routing match to a given address from a plurality of entries corresponding to routing information in a router, the method comprising:

storing the plurality of entries in a plurality of primary retrieving circuits each primary retrieving circuit including a memory storing at least one entry and a corresponding;

searching the memory for an entry which is a longest match to the given address and further searching the memory for a primary match entry matching the primary match mask;

performing a logical OR function to select a longest match mask from the primary match masks input from the primary retrieving circuits to output the longest match mask as the input mask to the primary retrieving circuits so that each of the primary retrieving circuits outputs the primary match entry associated with the longest match mask, the longest match mask having longest non-masking bit length among the primary match masks; and selecting a longest match entry from primary match entries inputted from the primary retrieving circuits depending on which primary match mask is the longest match mask to output the longest match entry as the longest match.

23. A router for determining a next hop destination of an input packet by retrieving a longest routing match to an ultimate destination address of the input packet from a plurality of entries, comprising:

an address extractor for extracting the ultimate destination address from the input packet;

a plurality of primary retrieving circuits each comprising a memory storing at least one first entry with a corresponding mask so that the primary retrieving circuits store the plurality of entries, wherein each of the primary retrieving circuits retrieves a primary match entry which is a longest match to the ultimate destination address to produce a primary match mask associated with the primary match entry;

a selector performing a logical OR operation for selecting a longest match mask from primary match masks obtained by the primary retrieving circuits, the longest match mask having a longest non-masking bit length among the primary match masks;

at least one associative memory storing a plurality of second entries each formed by coupling an entry and corresponding mask, wherein the associative memory accesses a second entry associated with a combination of the ultimate destination address and the longest match mask to output an entry included in the secondary entry accessed as the longest match; and a switch for switching a next hop destination of the packet depending on the longest match.

24. A router for determining a next hop destination of an input packet by retrieving a longest routing match to an ultimate destination address from a plurality of entries, the router comprising:

an address extractor for extracting the ultimate destination address from the input packet;

a plurality of primary retrieving circuits each comprising a memory storing at least one entry and a mask associated therewith, wherein each of the primary retrieving circuits retrieves an entry which is a longest match to the ultimate destination address and outputs the mask associated with that entry;

a plurality of associative memories each corresponding to a respective primary retrieving circuits, each of the associative memories storing said at least one entry from the respective primary retrieving circuit, wherein each of the associative memories outputs the entry associated with the ultimate destination address;

a selector performing a logical OR operation selectively enabling the associative memories depending on which mask output by the primary retrieving circuits has a longest non-masking bit length;

a combiner for combining the output entries of each enabled associative memory to produce the longest routing match; and a switch for switching a next hop destination of the packet depending on the longest routing match.

25. A router for determining a next hop destination of an input packet by retrieving a longest routing match to ultimate destination address from a plurality of entries, comprising:

an address extractor for extracting the ultimate destination address from the input packet;

a plurality of primary retrieving circuits each comprising:

a memory storing at least one first entry with a corresponding mask so that the primary retrieving circuits store the plurality of entries; and a searcher for searching the memory for an entry which is a longest match to the ultimate destination address to output a primary match mask associated with the entry and further searching the memory for a primary match entry matching to the primary match mask;

a selector performing a logical OR operation for selecting a longest match mask from primary match masks inputted from the primary retrieving circuits, the longest routing match mask having a longest non-masking bit length among the primary match masks;

a second logic circuit for selecting a longest match entry from primary match entries inputted from the primary retrieving circuits depending on which primary match mask is the longest match mask to output the longest match entry as the longest match; and a switch for switching a next hop destination of the packet depending on the longest match.

26. A router for determining a next hop destination of an input packet by retrieving a longest routing match to ultimate destination address from a plurality of entries, comprising:

an address extractor for extracting the ultimate destination address from the input packet;

a plurality of primary retrieving circuits each comprising:

a memory storing at least one entry with a corresponding mask so that the primary retrieving circuits store the plurality of entries; and a searcher for searching the memory for an entry which is a longest routing match to the ultimate destination address to output a primary match mask associated with the entry and further searching the memory for a primary match entry matching an input mask;

a selector performing a logical OR operation for selecting a longest match mask from primary match masks inputted from the primary retrieving circuits to output the longest match mask as the input mask to the primary retrieving circuits so that each of the primary retrieving circuits outputs the primary match entry associated with the longest match mask, the longest match mask having a longest non-masking bit length among the primary match mask;

a second logic circuit for selecting a longest match entry from primary match entries inputted from the primary retrieving circuits depending on which primary match mask is the longest match mask to output the longest match entry as the longest match; and a switch for switching a next hop destination of the packet depending on the longest match.

27. A router for determining a next hop destination of an input packet by retrieving a longest routing match to an ultimate destination address from a plurality of entries, the router comprising:

an address extractor for extracting the ultimate destination address from the input packet;

a plurality of primary retrieving circuits each comprising;

a memory storing at least one first entry and a mask associated therewith; and a searcher searching the memory for an entry which is a longest match to the ultimate destination address and outputting the mask associated with the entry when a selection clock signal is in a first state and searching the memory for a primary match entry matching the output mask when the selection clock signal is in a second state;

a selector performing a logical OR operation selecting a longest match mask from the masks input from the primary retrieving circuits when the selection clock signal is in the first state and outputting the longest match mask as the mask input to the primary retrieving circuits so that each of the primary retrieving circuits outputs the primary match entry associated with the longest match mask, the longest match mask having a longest non-masking bit length among the masks and, when the selection clock signal is in the second state, selecting a longest match entry from primary match entries input from the primary retrieving circuits based on the longest match mask and outputting the longest match entry as the longest routing match; and a switch for switching a next hop destination of the packet depending on the longest routing match.

* * * * *